(12) United States Patent
Rulli

(10) Patent No.: US 10,626,998 B2
(45) Date of Patent: Apr. 21, 2020

(54) DRIP EMITTER WITH CHECK VALVE

(71) Applicant: Rain Bird Corporation, Azusa, CA (US)

(72) Inventor: Samuel R. Rulli, Burbank, CA (US)

(73) Assignee: Rain Bird Corporation, Azusa, CA (US)

(*) Notice: Subject to any disclaimer, the term of this patent is extended or adjusted under 35 U.S.C. 154(b) by 0 days.

(21) Appl. No.: 15/595,427

(22) Filed: May 15, 2017

(65) Prior Publication Data

US 2018/0328498 A1    Nov. 15, 2018

(51) Int. Cl.
| | |
|---|---|
| *F16K 7/00* | (2006.01) |
| *F16K 7/07* | (2006.01) |
| *A01G 25/02* | (2006.01) |
| *F16K 7/08* | (2006.01) |
| *F16K 15/02* | (2006.01) |
| *A01G 25/00* | (2006.01) |

(52) U.S. Cl.
CPC .............. *F16K 7/07* (2013.01); *A01G 25/023* (2013.01); *F16K 7/08* (2013.01); *A01G 25/02* (2013.01); *A01G 2025/006* (2013.01); *F16K 15/02* (2013.01)

(58) Field of Classification Search
CPC ............................... A01G 25/02; A01G 25/023
USPC .......................... 239/569, 570, 571, 574, 542
See application file for complete search history.

(56) References Cited

U.S. PATENT DOCUMENTS

| | | | |
|---|---|---|---|
| 2,174,515 A | 10/1939 | Hughes | |
| 2,449,731 A | 9/1948 | Therrien | |
| 2,508,403 A | 5/1950 | Knauss | |
| 2,625,429 A | 1/1953 | Coles | |
| 2,639,194 A | 5/1953 | Wahlin | |
| 2,683,061 A | 7/1954 | Tuttle, Jr. | |
| 2,762,397 A * | 9/1956 | Miller | G05D 7/012 138/43 |
| 2,794,321 A | 6/1957 | Warner | |
| 2,873,030 A | 2/1959 | Ashton | |
| 2,970,923 A | 2/1961 | Sparmann | |
| 3,004,330 A | 10/1961 | Wilkins | |
| 3,155,612 A | 11/1964 | Weber | |
| 3,182,916 A | 5/1965 | Schulz | |
| 3,199,901 A | 8/1965 | Jeppsson | |

(Continued)

FOREIGN PATENT DOCUMENTS

| | | |
|---|---|---|
| AU | 511876 | 10/1978 |
| AU | 2004208646 | 3/2006 |

(Continued)

OTHER PUBLICATIONS

Alam, M., et al., "Subsurface Drip Irrigation for Alfalfa," Kansas State University, 2009, pp. 1-8.

(Continued)

*Primary Examiner* — Viet Le

(74) *Attorney, Agent, or Firm* — Fitch, Even, Tabin & Flannery LLP

(57) ABSTRACT

There is provided an online drip emitter that includes a check valve. The emitter uses a first diaphragm in the check valve and a second diaphragm spaced from the first diaphragm to provide pressure compensation. The second diaphragm communicates with a tortuous path and an outlet to regulate water emitting from the emitter depending on the supply pressure.

12 Claims, 14 Drawing Sheets

(56) References Cited

U.S. PATENT DOCUMENTS

| | | | |
|---|---|---|---|
| 3,302,450 | A | 2/1967 | Wakar |
| 3,323,550 | A | 6/1967 | Lee, II |
| 3,361,359 | A | 1/1968 | Chapin |
| 3,420,064 | A | 1/1969 | Blass |
| 3,426,544 | A | 2/1969 | Curtis |
| 3,434,500 | A | 3/1969 | Burrows |
| 3,467,142 | A | 9/1969 | Boyle |
| 3,586,291 | A | 6/1971 | Malec |
| 3,672,571 | A | 6/1972 | Goodricke |
| 3,693,888 | A | 9/1972 | Rondas |
| 3,697,002 | A | 10/1972 | Parkison |
| 3,698,195 | A | 10/1972 | Chapin |
| 3,719,327 | A | 3/1973 | McMahan |
| 3,727,635 | A | 4/1973 | Todd |
| 3,729,142 | A | 4/1973 | Rangel-Garza |
| 3,753,527 | A | 8/1973 | Galbraith |
| 3,777,980 | A * | 12/1973 | Allport ............... A01G 25/023 239/272 |
| 3,777,987 | A | 12/1973 | Allport |
| 3,779,468 | A | 12/1973 | Spencer |
| 3,780,946 | A | 12/1973 | Smith |
| 3,791,587 | A | 2/1974 | Drori |
| 3,792,588 | A | 2/1974 | Gilaad |
| 3,797,741 | A | 3/1974 | Spencer |
| 3,804,334 | A | 4/1974 | Curry |
| 3,807,430 | A | 4/1974 | Keller |
| 3,814,377 | A | 6/1974 | Todd |
| 3,815,636 | A | 6/1974 | Menzel |
| RE28,095 | E | 7/1974 | Chapin |
| 3,830,067 | A | 8/1974 | Osborn |
| 3,833,019 | A | 9/1974 | Diggs |
| 3,851,896 | A | 12/1974 | Olson |
| 3,856,333 | A | 12/1974 | Cox |
| 3,863,845 | A | 2/1975 | Bumpstead |
| 3,866,833 | A | 2/1975 | Shibata |
| 3,870,236 | A | 3/1975 | Sahagun-Barragan |
| 3,873,030 | A | 3/1975 | Sahagun-Barragan |
| 3,874,598 | A | 4/1975 | Havens |
| 3,882,892 | A | 5/1975 | Menzel |
| 3,885,743 | A | 5/1975 | Wake |
| 3,895,085 | A | 7/1975 | Suzuki |
| 3,896,999 | A * | 7/1975 | Barragan ............... A01G 25/02 239/107 |
| 3,897,009 | A | 7/1975 | Rangel-Garza |
| 3,903,929 | A | 9/1975 | Mock |
| 3,929,258 | A | 12/1975 | Stephens |
| 3,939,875 | A | 2/1976 | Osborn |
| 3,940,066 | A | 2/1976 | Hunter |
| 3,948,285 | A | 4/1976 | Flynn |
| 3,954,223 | A | 5/1976 | Wichman |
| 3,957,292 | A | 5/1976 | Diggs |
| 3,966,233 | A | 6/1976 | Diggs |
| 3,970,251 | A | 7/1976 | Harmony |
| 3,973,732 | A | 8/1976 | Diggs |
| 3,981,452 | A | 9/1976 | Eckstein |
| 3,993,248 | A | 11/1976 | Harmony |
| 3,995,436 | A | 12/1976 | Diggs |
| 3,998,244 | A | 12/1976 | Bentley |
| 3,998,391 | A * | 12/1976 | Lemelshtrich ....... A01G 25/023 239/542 |
| 3,998,427 | A | 12/1976 | Bentley |
| 4,008,853 | A | 2/1977 | Tregillus |
| 4,017,958 | A | 4/1977 | Diggs |
| 4,022,384 | A | 5/1977 | Hoyle |
| 4,036,435 | A | 7/1977 | Pecaro |
| 4,037,791 | A | 7/1977 | Mullett |
| 4,047,995 | A | 9/1977 | Leal-Diaz |
| 4,054,152 | A * | 10/1977 | Ito ........................ F16K 15/148 137/512 |
| 4,058,257 | A | 11/1977 | Spencer |
| 4,059,228 | A | 11/1977 | Werner |
| 4,077,570 | A | 3/1978 | Harmony |
| 4,077,571 | A | 3/1978 | Harmony |
| 4,084,749 | A * | 4/1978 | Drori ................... A01G 25/023 239/271 |
| 4,092,002 | A | 5/1978 | Grosse |
| 4,095,750 | A | 6/1978 | Gilead |
| 4,105,162 | A | 8/1978 | Drori |
| 4,121,771 | A | 10/1978 | Hendrickson |
| 4,122,590 | A | 10/1978 | Spencer |
| 4,128,918 | A | 12/1978 | Wenk |
| 4,132,364 | A | 1/1979 | Harmony |
| 4,134,550 | A | 1/1979 | Bright |
| 4,143,820 | A | 3/1979 | Bright |
| 4,147,307 | A | 4/1979 | Christy |
| 4,160,323 | A | 7/1979 | Tracy |
| 4,161,291 | A * | 7/1979 | Bentley ............... A01G 25/023 239/542 |
| 4,177,946 | A | 12/1979 | Sahagun-Barragan |
| 4,177,947 | A | 12/1979 | Menzel |
| 4,196,753 | A * | 4/1980 | Hammarstedt ...... G05D 7/0113 138/43 |
| 4,196,853 | A | 4/1980 | Delmer |
| 4,209,133 | A * | 6/1980 | Mehoudar ............ A01G 25/023 239/542 |
| 4,210,287 | A | 7/1980 | Mehoudar |
| 4,215,822 | A | 8/1980 | Mehoudar |
| 4,223,838 | A | 9/1980 | Maria-Vittorio-Torrisi |
| 4,225,307 | A | 9/1980 | Magera |
| 4,226,368 | A | 10/1980 | Hunter |
| 4,235,380 | A | 11/1980 | Delmer |
| 4,247,051 | A | 1/1981 | Allport |
| 4,250,915 | A | 2/1981 | Rikuta |
| 4,273,286 | A | 6/1981 | Menzel |
| 4,274,597 | A | 6/1981 | Dobos |
| 4,281,798 | A | 8/1981 | Lemelstrich |
| 4,307,841 | A | 12/1981 | Mehoudar |
| 4,331,293 | A | 5/1982 | Rangel-Garza |
| 4,344,576 | A * | 8/1982 | Smith .................... B05B 15/50 239/542 |
| 4,354,639 | A | 10/1982 | Delmer |
| 4,366,926 | A | 1/1983 | Mehoudar |
| 4,369,923 | A * | 1/1983 | Bron ..................... B05B 1/3006 239/533.1 |
| 4,384,680 | A | 5/1983 | Mehoudar |
| 4,385,727 | A | 5/1983 | Spencer |
| 4,385,757 | A | 5/1983 | Muller |
| 4,392,616 | A | 7/1983 | Olson |
| 4,413,786 | A | 11/1983 | Mehoudar |
| 4,413,787 | A | 11/1983 | Gilead |
| 4,423,838 | A | 1/1984 | Dinur |
| 4,424,936 | A | 1/1984 | Marc |
| 4,430,020 | A | 2/1984 | Robbins |
| 4,460,129 | A | 7/1984 | Olson |
| 4,473,191 | A | 9/1984 | Chapin |
| 4,473,525 | A | 9/1984 | Drori |
| 4,502,631 | A | 3/1985 | Christen |
| 4,508,140 | A | 4/1985 | Harrison |
| 4,513,777 | A | 4/1985 | Wright |
| 4,519,546 | A | 5/1985 | Gorney |
| 4,522,339 | A | 6/1985 | Costa |
| 4,533,083 | A | 8/1985 | Tucker |
| 4,534,515 | A | 8/1985 | Chapin |
| 4,545,784 | A | 10/1985 | Sanderson |
| 4,550,878 | A | 11/1985 | Rosenberg |
| 4,572,756 | A | 2/1986 | Chapin |
| 4,573,640 | A | 3/1986 | Mehoudar |
| 4,593,857 | A | 6/1986 | Raz |
| 4,613,080 | A * | 9/1986 | Benson ................. A01G 25/16 138/45 |
| 4,626,130 | A | 12/1986 | Chapin |
| 4,627,903 | A | 12/1986 | Chapman |
| 4,642,152 | A | 2/1987 | Chapin |
| 4,653,695 | A | 3/1987 | Eckstein |
| 4,687,143 | A | 8/1987 | Gorney |
| 4,702,787 | A | 10/1987 | Ruskin |
| 4,718,608 | A | 1/1988 | Mehoudar |
| 4,722,481 | A | 2/1988 | Lemkin |
| 4,722,759 | A | 2/1988 | Roberts |
| 4,726,520 | A | 2/1988 | Brown |
| 4,726,527 | A | 2/1988 | Mendenhall |
| 4,728,042 | A | 3/1988 | Gorney |

(56) References Cited

U.S. PATENT DOCUMENTS

| | | | | |
|---|---|---|---|---|
| 4,735,363 | A | 4/1988 | Shfaram | |
| 4,749,130 | A | 6/1988 | Utzinger | |
| 4,753,394 | A | 6/1988 | Goodman | |
| 4,756,339 | A | 7/1988 | Buluschek | |
| 4,765,541 | A | 8/1988 | Mangels | |
| 4,775,046 | A | 10/1988 | Gramarossa | |
| 4,781,217 | A | 11/1988 | Rosenberg | |
| 4,789,005 | A | 12/1988 | Griffiths | |
| 4,796,660 | A | 1/1989 | Bron | |
| 4,807,668 | A | 2/1989 | Roberts | |
| 4,817,875 | A * | 4/1989 | Karmeli | A01G 25/023 239/542 |
| 4,824,019 | A | 4/1989 | Lew | |
| 4,824,025 | A | 4/1989 | Miller | |
| 4,850,531 | A | 7/1989 | Littleton | |
| 4,854,158 | A | 8/1989 | Gates | |
| 4,856,552 | A | 8/1989 | Hiemstra | |
| 4,859,264 | A | 8/1989 | Buluschek | |
| 4,862,731 | A | 9/1989 | Gates | |
| 4,874,132 | A | 10/1989 | Gilead | |
| 4,880,167 | A | 11/1989 | Langa | |
| 4,900,437 | A | 2/1990 | Savall | |
| 4,909,411 | A | 3/1990 | Uchida | |
| 4,935,992 | A | 6/1990 | Due | |
| 4,948,295 | A | 8/1990 | Pramsoler | |
| 4,984,739 | A | 1/1991 | Allport | |
| 4,990,256 | A | 2/1991 | Schmidt | |
| 5,022,940 | A | 6/1991 | Mehoudar | |
| 5,031,837 | A | 7/1991 | Hanish | |
| 5,040,770 | A | 8/1991 | Rajster | |
| 5,052,625 | A | 10/1991 | Ruskin | |
| 5,096,206 | A | 3/1992 | Andre | |
| 5,106,021 | A | 4/1992 | Gilead | |
| 5,111,995 | A | 5/1992 | Dumitrascu | |
| 5,111,996 | A | 5/1992 | Eckstein | |
| 5,116,414 | A | 5/1992 | Burton | |
| 5,118,042 | A | 6/1992 | Delmer | |
| 5,118,215 | A | 6/1992 | Freier | |
| 5,122,044 | A | 6/1992 | Mehoudar | |
| 5,123,984 | A | 6/1992 | Allport | |
| 5,137,216 | A | 8/1992 | Hanish | |
| 5,141,360 | A | 8/1992 | Zeman | |
| 5,163,622 | A | 11/1992 | Cohen | |
| 5,181,952 | A | 1/1993 | Burton | |
| 5,183,208 | A | 2/1993 | Cohen | |
| 5,192,027 | A | 3/1993 | Delmer | |
| 5,200,132 | A | 4/1993 | Shfaram | |
| 5,203,503 | A | 4/1993 | Cohen | |
| 5,207,386 | A | 5/1993 | Mehoudar | |
| 5,216,784 | A | 6/1993 | Dyer | |
| 5,232,159 | A | 8/1993 | Abbate | |
| 5,232,160 | A | 8/1993 | Hendrickson | |
| 5,236,130 | A | 8/1993 | Hadar | |
| 5,246,171 | A | 9/1993 | Roberts | |
| 5,252,162 | A | 10/1993 | Delmer | |
| 5,253,807 | A | 10/1993 | Newbegin | |
| 5,271,786 | A | 12/1993 | Gorney | |
| 5,279,462 | A * | 1/1994 | Mehoudar | A01G 25/023 239/533.13 |
| 5,282,578 | A | 2/1994 | De Frank | |
| 5,282,916 | A | 2/1994 | Bloom | |
| 5,283,916 | A | 2/1994 | Haro | |
| 5,294,058 | A | 3/1994 | Einav | |
| 5,310,438 | A | 5/1994 | Ruskin | |
| 5,314,116 | A | 5/1994 | Krauth | |
| 5,316,220 | A | 5/1994 | Dinur | |
| 5,318,657 | A | 6/1994 | Roberts | |
| 5,324,371 | A | 6/1994 | Mehoudar | |
| 5,324,379 | A | 6/1994 | Eckstein | |
| 5,327,941 | A | 7/1994 | Bitsakis | |
| 5,330,107 | A | 7/1994 | Karathanos | |
| 5,332,160 | A | 7/1994 | Ruskin | |
| 5,333,793 | A | 8/1994 | DeFrank | |
| 5,337,597 | A | 8/1994 | Peake | |
| 5,340,027 | A | 8/1994 | Yu | |
| 5,353,993 | A | 10/1994 | Rosenberg | |
| 5,364,032 | A | 11/1994 | De Frank | |
| 5,399,160 | A | 3/1995 | Dunberger | |
| 5,400,967 | A | 3/1995 | Yu | |
| 5,400,973 | A | 3/1995 | Cohen | |
| 5,413,282 | A * | 5/1995 | Boswell | A01G 25/023 239/542 |
| 5,423,501 | A | 6/1995 | Yu | |
| 5,441,203 | A | 8/1995 | Swan | |
| 5,442,001 | A | 8/1995 | Jones | |
| 5,443,212 | A | 8/1995 | Dinur | |
| 5,449,250 | A | 9/1995 | Burton | |
| 5,465,905 | A * | 11/1995 | Elder | A01G 25/023 239/75 |
| 5,522,551 | A | 6/1996 | DeFrank | |
| 5,531,381 | A | 7/1996 | Ruttenberg | |
| 5,535,778 | A | 7/1996 | Zakai | |
| 5,584,952 | A | 12/1996 | Rubenstein | |
| 5,586,727 | A | 12/1996 | Shekalim | |
| 5,591,293 | A | 1/1997 | Miller | |
| 5,601,381 | A | 2/1997 | Hadar | |
| 5,609,303 | A | 3/1997 | Cohen | |
| 5,615,833 | A | 4/1997 | Robillard | |
| 5,615,838 | A * | 4/1997 | Eckstein | A01G 25/023 239/533.1 |
| 5,620,143 | A | 4/1997 | Delmer | |
| 5,628,462 | A | 5/1997 | Miller | |
| 5,634,594 | A | 6/1997 | Cohen | |
| 5,636,797 | A * | 6/1997 | Cohen | A01G 25/023 239/542 |
| 5,641,113 | A | 6/1997 | Somaki | |
| 5,651,999 | A | 7/1997 | Armentrout | |
| 5,673,852 | A | 10/1997 | Roberts | |
| 5,676,897 | A | 10/1997 | Dermitzakis | |
| 5,695,127 | A | 12/1997 | Delmer | |
| 5,711,482 | A * | 1/1998 | Yu | A01G 25/023 239/11 |
| 5,722,601 | A | 3/1998 | DeFrank | |
| 5,727,733 | A | 3/1998 | Ruttenberg | |
| 5,732,887 | A | 3/1998 | Roberts | |
| 5,744,423 | A | 4/1998 | Van Voris | |
| 5,744,779 | A | 4/1998 | Buluschek | |
| RE35,857 | E | 7/1998 | Mehoudar | |
| 5,785,785 | A | 7/1998 | Delmer | |
| 5,813,603 | A * | 9/1998 | Kurtz | A01G 25/023 239/1 |
| 5,820,028 | A | 10/1998 | Dinur | |
| 5,820,029 | A * | 10/1998 | Marans | A01G 25/023 239/542 |
| 5,829,685 | A | 11/1998 | Cohen | |
| 5,829,686 | A * | 11/1998 | Cohen | A01G 25/023 239/533.1 |
| 5,855,324 | A | 1/1999 | DeFrank | |
| 5,865,377 | A | 2/1999 | DeFrank | |
| 5,871,325 | A | 2/1999 | Schmidt | |
| 5,875,815 | A | 3/1999 | Ungerecht | |
| 5,898,019 | A | 4/1999 | Van Voris | |
| 5,944,260 | A | 8/1999 | Wang | |
| 5,957,391 | A | 9/1999 | DeFrank | |
| 5,972,375 | A | 10/1999 | Truter | |
| 5,988,211 | A * | 11/1999 | Cornell | G05D 7/0113 137/501 |
| 5,996,909 | A | 12/1999 | Lin | |
| 6,015,102 | A | 1/2000 | Daigle | |
| 6,026,850 | A | 2/2000 | Newton | |
| 6,027,048 | A * | 2/2000 | Mehoudar | A01G 25/023 138/42 |
| 6,039,270 | A | 3/2000 | Dermitzakis | |
| 6,062,245 | A | 5/2000 | Berglind | |
| 6,085,986 | A * | 7/2000 | Yu | A01G 25/023 239/1 |
| 6,095,185 | A | 8/2000 | Rosenberg | |
| 6,109,296 | A | 8/2000 | Austin | |
| 6,116,523 | A | 9/2000 | Cabahug | |
| 6,120,634 | A | 9/2000 | Harrold | |
| 6,164,605 | A | 12/2000 | Drake | |
| 6,179,949 | B1 | 1/2001 | Buluschek | |
| 6,180,162 | B1 | 1/2001 | Shigeru | |

(56) References Cited

U.S. PATENT DOCUMENTS

| | | |
|---|---|---|
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert |
| 6,302,338 B1 | 10/2001 | Cohen |
| 6,305,617 B1 | 10/2001 | Yu |
| 6,308,768 B1 | 10/2001 | Rice |
| 6,308,902 B1 | 10/2001 | Huntley |
| D450,550 S | 11/2001 | Roberts |
| 6,334,958 B1 | 1/2002 | Ruskin |
| 6,343,616 B1 | 2/2002 | Houtchens |
| D455,055 S | 4/2002 | Roberts |
| 6,371,390 B1 | 4/2002 | Cohen |
| 6,382,530 B1 | 5/2002 | Perkins |
| 6,394,412 B2 | 5/2002 | Zakai |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz |
| 6,464,152 B1 * | 10/2002 | Bolinis ............... A01G 25/023 239/542 |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |
| 6,557,819 B2 | 5/2003 | Austin |
| 6,561,443 B2 | 5/2003 | Delmer |
| 6,568,607 B2 * | 5/2003 | Boswell ............... A01G 25/023 239/542 |
| 6,581,262 B1 | 6/2003 | Myers |
| 6,581,854 B2 | 6/2003 | Eckstein |
| 6,581,902 B2 | 6/2003 | Michau |
| 6,620,278 B1 | 9/2003 | Harrold |
| 6,622,427 B2 | 9/2003 | Breitner |
| 6,622,946 B2 | 9/2003 | Held |
| 6,691,739 B2 | 2/2004 | Rosenberg |
| 6,736,337 B2 | 5/2004 | Vildibill |
| 6,750,760 B2 | 6/2004 | Albritton |
| 6,764,029 B2 | 7/2004 | Rosenberg |
| 6,817,548 B2 | 11/2004 | Krauth |
| 6,821,928 B2 | 11/2004 | Ruskin |
| 6,827,298 B2 | 12/2004 | Sacks |
| 6,830,203 B2 | 12/2004 | Neyestani |
| 6,875,491 B2 | 4/2005 | Miyamoto |
| 6,886,761 B2 | 5/2005 | Cohen |
| 6,894,250 B2 | 5/2005 | Kertscher |
| 6,896,758 B1 | 5/2005 | Giuffre' |
| 6,920,907 B2 | 7/2005 | Harrold |
| 6,933,337 B2 | 8/2005 | Lang |
| 6,936,126 B2 | 8/2005 | DeFrank |
| 6,945,476 B2 | 9/2005 | Giuffre |
| 6,996,932 B2 | 2/2006 | Kruer |
| 6,997,402 B2 | 2/2006 | Kruer |
| 7,007,916 B2 | 3/2006 | Lee |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,284,302 B2 | 10/2007 | Lares |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,506,658 B2 | 3/2009 | Guest |
| 7,530,382 B2 | 5/2009 | Kertscher |
| 7,648,085 B2 | 1/2010 | Mavrakis |
| 7,681,805 B2 | 3/2010 | Belford |
| 7,681,810 B2 | 3/2010 | Keren |
| 7,695,587 B2 | 4/2010 | Kertscher |
| 7,712,253 B2 | 5/2010 | Gesser |
| 7,735,758 B2 | 6/2010 | Cohen |
| 7,748,930 B2 | 7/2010 | Gesser |
| 7,775,237 B2 | 8/2010 | Keren |
| 7,802,592 B2 | 9/2010 | McCarty |
| 7,887,664 B1 | 2/2011 | Mata |
| 7,900,656 B2 | 3/2011 | Masarwa |
| 7,913,935 B2 | 3/2011 | Einav |
| 7,954,732 B2 | 6/2011 | Shekalim |
| 7,988,076 B2 | 8/2011 | Mamo |
| 8,002,496 B2 | 8/2011 | Giuffre |
| 8,011,852 B2 | 9/2011 | Gesser |
| 8,033,300 B2 | 10/2011 | McCarty |
| D648,191 S | 11/2011 | Thayer |
| 8,051,871 B2 | 11/2011 | Shani |
| 8,079,385 B2 | 12/2011 | Hatton |
| 8,091,276 B2 | 1/2012 | Gesser |
| 8,091,800 B2 | 1/2012 | Retter |
| 8,096,491 B2 | 1/2012 | Lutzki |
| 8,136,246 B2 | 3/2012 | So |
| 8,141,589 B2 | 3/2012 | Socolsky |
| D657,638 S | 4/2012 | Einav |
| 8,220,727 B2 | 7/2012 | Lee |
| 8,267,115 B2 | 9/2012 | Giuffre' |
| 8,286,667 B2 | 10/2012 | Ruskin |
| 8,302,887 B2 | 11/2012 | Park |
| 8,317,111 B2 | 11/2012 | Cohen |
| 8,372,326 B2 | 2/2013 | Mamo |
| 8,381,437 B2 | 2/2013 | Ciudaj |
| 8,439,282 B2 * | 5/2013 | Allen ................... A01G 25/023 137/505 |
| 8,454,786 B2 | 6/2013 | Guichard |
| 8,469,294 B2 | 6/2013 | Mata |
| 8,475,617 B2 | 7/2013 | Kertscher |
| 8,496,193 B2 | 7/2013 | Rosenberg |
| 8,511,585 B2 | 8/2013 | Keren |
| 8,511,586 B2 | 8/2013 | Einav |
| 8,579,215 B2 | 11/2013 | Zavoli |
| 8,584,398 B2 | 11/2013 | Gesser |
| 8,628,032 B2 | 1/2014 | Feith |
| 8,663,525 B2 | 3/2014 | Mamo |
| 8,689,484 B2 | 4/2014 | Ruskin |
| 8,714,181 B2 | 5/2014 | Shani |
| 8,714,205 B2 | 5/2014 | Loebinger |
| 8,763,934 B2 | 7/2014 | Patel |
| 8,770,888 B2 | 7/2014 | Helbig |
| 8,870,098 B2 | 10/2014 | Lutzki |
| 8,882,004 B2 | 11/2014 | Gorney |
| 8,998,112 B2 | 4/2015 | Cohen |
| 8,998,113 B2 | 4/2015 | Keren |
| 9,022,059 B2 | 5/2015 | Cohen |
| 9,022,764 B2 | 5/2015 | Wisler |
| 9,027,856 B2 | 5/2015 | DeFrank |
| D740,940 S | 10/2015 | Fregoso |
| 9,192,108 B2 | 11/2015 | Kertscher |
| 9,253,950 B1 * | 2/2016 | Clark .................. A01G 25/023 |
| 9,253,951 B2 | 2/2016 | Herrera |
| 9,258,949 B2 * | 2/2016 | Nourian ............... A01G 25/023 |
| 9,258,950 B2 | 2/2016 | Kidachi |
| 9,291,276 B2 * | 3/2016 | Keren ...................... F16K 7/17 |
| 9,307,705 B2 * | 4/2016 | Akritanakis ......... A01G 25/023 |
| 9,345,205 B2 | 5/2016 | Kidachi |
| 9,380,749 B2 | 7/2016 | Akritanakis |
| 9,386,752 B2 | 7/2016 | Einav |
| 9,433,157 B2 | 9/2016 | Dermitzakis |
| 9,439,366 B2 * | 9/2016 | Kidachi ............... A01G 25/023 |
| 9,485,923 B2 | 11/2016 | Ensworth |
| D781,115 S | 3/2017 | Einav |
| 9,695,965 B2 * | 7/2017 | Hadas .................. F16L 29/007 |
| 9,814,189 B1 | 11/2017 | Clark |
| 9,872,444 B2 | 1/2018 | Turk |
| 9,877,440 B2 | 1/2018 | Ensworth |
| 9,877,441 B2 | 1/2018 | Ensworth |
| 9,877,442 B2 | 1/2018 | Kim |
| D811,179 S | 2/2018 | Ensworth |
| 9,894,851 B2 | 2/2018 | Desarzens |
| 9,938,680 B2 | 4/2018 | Smith |
| 9,949,448 B2 | 4/2018 | Cohen |
| D816,439 S | 5/2018 | Crook |

(56) References Cited

U.S. PATENT DOCUMENTS

| | | |
|---|---|---|
| 1,001,003 A1 | 7/2018 | Motha |
| 10,034,439 B2 | 7/2018 | Kidachi |
| D826,662 S | 8/2018 | Ensworth |
| 10,070,595 B2 | 9/2018 | Loebinger |
| 10,085,391 B2 | 10/2018 | Haub |
| 10,107,707 B2 | 10/2018 | DeFrank |
| 10,172,302 B2 | 1/2019 | Keren |
| 10,212,896 B2 | 2/2019 | Kidachi |
| 10,271,484 B2 | 4/2019 | Einav |
| 10,299,444 B2 | 5/2019 | Cohen |
| 10,349,587 B2 | 7/2019 | Einav |
| 10,375,904 B2 | 8/2019 | Ensworth |
| 10,455,780 B2 | 10/2019 | Cohen |
| 10,462,983 B2 | 11/2019 | Socolsky |
| 2002/0064935 A1 | 5/2002 | Honda |
| 2002/0070297 A1* | 6/2002 | Bolinis ............... A01G 25/023 239/542 |
| 2002/0074434 A1 | 6/2002 | Delmer |
| 2002/0088877 A1 | 7/2002 | Bertolotti |
| 2002/0104902 A1 | 8/2002 | Eckstein |
| 2002/0104903 A1 | 8/2002 | Eckstein |
| 2002/0113147 A1 | 8/2002 | Huntley |
| 2003/0029937 A1* | 2/2003 | Dermitzakis ........ A01G 25/023 239/542 |
| 2003/0042335 A1 | 3/2003 | Krauth |
| 2003/0050372 A1 | 3/2003 | Stanhope |
| 2003/0057301 A1* | 3/2003 | Cohen .................. A01G 25/02 239/542 |
| 2003/0089409 A1 | 5/2003 | Morimoto |
| 2003/0089803 A1 | 5/2003 | Huntley |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber |
| 2004/0018263 A1 | 1/2004 | Hashimshony |
| 2004/0164185 A1 | 8/2004 | Giuffre |
| 2005/0029231 A1 | 2/2005 | Kertscher |
| 2005/0077396 A1 | 4/2005 | Rabinowitz |
| 2005/0103409 A1* | 5/2005 | Weber .................. E04D 13/002 148/684 |
| 2005/0133613 A1 | 6/2005 | Mayer |
| 2005/0224607 A1 | 10/2005 | Dinur |
| 2005/0224962 A1 | 10/2005 | Akamatsu |
| 2005/0258278 A1 | 11/2005 | Cohen |
| 2005/0258279 A1 | 11/2005 | Harrold |
| 2005/0279856 A1 | 12/2005 | Nalbandian |
| 2005/0279866 A1 | 12/2005 | Belford |
| 2005/0284966 A1 | 12/2005 | DeFrank |
| 2006/0032949 A1 | 2/2006 | Lo |
| 2006/0043219 A1 | 3/2006 | Raanan |
| 2006/0144965 A1* | 7/2006 | Keren ................... A01G 25/02 239/542 |
| 2006/0163388 A1* | 7/2006 | Mari .................... A01G 25/023 239/542 |
| 2006/0169805 A1 | 8/2006 | Dabir |
| 2006/0186228 A1 | 8/2006 | Belford |
| 2006/0202381 A1 | 9/2006 | Bach |
| 2006/0237561 A1 | 10/2006 | Park |
| 2006/0255186 A1* | 11/2006 | Ruskin ................. A01G 25/023 239/542 |
| 2007/0095950 A1 | 5/2007 | Kim |
| 2007/0108318 A1* | 5/2007 | Mamo .................. A01G 25/023 239/542 |
| 2007/0138323 A1 | 6/2007 | Lee |
| 2007/0175580 A1 | 8/2007 | Mata |
| 2007/0187031 A1 | 8/2007 | Kertscher |
| 2007/0194149 A1 | 8/2007 | Mavrakis |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0190256 A1 | 8/2008 | So |
| 2008/0237374 A1 | 10/2008 | Belford |
| 2008/0257991 A1* | 10/2008 | Einav .................. B05B 15/70 239/542 |
| 2008/0265064 A1* | 10/2008 | Keren .................. F16K 15/141 239/533.1 |
| 2009/0020634 A1* | 1/2009 | Schweitzer .......... A01G 25/023 239/542 |
| 2009/0065084 A1 | 3/2009 | Masarwa |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1* | 7/2009 | Gorney ............... A01G 25/023 239/542 |
| 2009/0243146 A1 | 10/2009 | Retter |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2009/0320932 A1* | 12/2009 | Giuffre' .............. G05D 7/0113 137/67 |
| 2010/0000674 A1 | 1/2010 | Voigtmann |
| 2010/0023717 A1 | 1/2010 | Jinno |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155508 A1* | 6/2010 | Keren .................. A01G 25/023 239/542 |
| 2010/0163651 A1* | 7/2010 | Feith .................... A01G 25/023 239/542 |
| 2010/0175408 A1 | 7/2010 | Korda |
| 2010/0219265 A1 | 9/2010 | Feld |
| 2010/0237170 A1* | 9/2010 | Rosenberg ........... A01G 25/023 239/106 |
| 2010/0244315 A1* | 9/2010 | Mamo .................. B29C 45/1635 264/255 |
| 2010/0252126 A1 | 10/2010 | Roes |
| 2010/0252127 A1 | 10/2010 | Gross |
| 2010/0282873 A1 | 11/2010 | Mattlin |
| 2010/0319784 A1 | 12/2010 | Kuhne |
| 2011/0186652 A1 | 8/2011 | Cohen |
| 2011/0226354 A1 | 9/2011 | Thordarson |
| 2012/0012678 A1 | 1/2012 | Gregory |
| 2012/0012682 A1 | 1/2012 | Einav |
| 2012/0074345 A1* | 3/2012 | Hatton ................. F16K 15/145 251/359 |
| 2012/0097196 A1* | 4/2012 | Cohen .................. A01G 25/023 134/110 |
| 2012/0097254 A1 | 4/2012 | Cohen |
| 2012/0097769 A1 | 4/2012 | Zavoli |
| 2012/0104648 A1 | 5/2012 | Yiflach |
| 2012/0126036 A1 | 5/2012 | Patel |
| 2012/0180875 A1 | 7/2012 | Keller |
| 2012/0199673 A1 | 8/2012 | Cohen |
| 2012/0256017 A1 | 10/2012 | Gorney |
| 2012/0267454 A1 | 10/2012 | Einav |
| 2012/0305676 A1* | 12/2012 | Keren .................. A01G 25/023 239/542 |
| 2013/0181066 A1 | 7/2013 | Dermitzakis |
| 2013/0248616 A1* | 9/2013 | Ensworth ............. A01G 25/026 239/11 |
| 2013/0248622 A1 | 9/2013 | Kim |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0246520 A1 | 9/2014 | Einav |
| 2014/0263758 A1* | 9/2014 | Turk .................... A01G 25/023 239/542 |
| 2015/0014446 A1 | 1/2015 | Cohen |
| 2015/0041563 A1 | 2/2015 | Ensworth |
| 2015/0041564 A1 | 2/2015 | Ensworth |
| 2015/0090815 A1 | 4/2015 | Akritanakis |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0181820 A1 | 7/2015 | Crook |

(56) References Cited

U.S. PATENT DOCUMENTS

| | | |
|---|---|---|
| 2015/0201568 A1 | 7/2015 | Einav |
| 2015/0223414 A1 | 8/2015 | Kidachi |
| 2015/0250111 A1* | 9/2015 | Kidachi ............. A01G 25/023 239/542 |
| 2015/0296723 A1 | 10/2015 | Jain |
| 2015/0319940 A1 | 11/2015 | Kidachi |
| 2015/0351333 A1 | 12/2015 | Eberle |
| 2016/0057947 A1* | 3/2016 | Ensworth ............. A01G 25/023 239/542 |
| 2016/0075070 A1 | 3/2016 | Verelis |
| 2016/0076965 A1 | 3/2016 | Edris |
| 2016/0088806 A1 | 3/2016 | Haub |
| 2016/0095285 A1 | 4/2016 | Loebinger |
| 2016/0143231 A2 | 5/2016 | Motha |
| 2016/0146388 A1 | 5/2016 | Smith |
| 2016/0198643 A1 | 7/2016 | Cohen |
| 2016/0219802 A1 | 8/2016 | Ensworth |
| 2016/0219803 A1 | 8/2016 | Keren |
| 2016/0223092 A1 | 8/2016 | Hadas |
| 2016/0278311 A1* | 9/2016 | Kidachi ............. A01G 25/023 |
| 2016/0286741 A1* | 10/2016 | Kidachi ............. A01G 25/023 |
| 2016/0286743 A1 | 10/2016 | Einav |
| 2016/0309669 A1 | 10/2016 | Kidachi |
| 2016/0330917 A1* | 11/2016 | Kidachi ............. A01G 25/023 |
| 2017/0035005 A1 | 2/2017 | Kidachi |
| 2017/0035006 A1 | 2/2017 | Kim |
| 2017/0112078 A1 | 4/2017 | Ensworth |
| 2017/0118927 A1 | 5/2017 | Loebinger |
| 2017/0142916 A1* | 5/2017 | Shamshery ......... A01G 25/023 |
| 2017/0205013 A1* | 7/2017 | Smith ................. F16L 41/065 |
| 2017/0290277 A1 | 10/2017 | Cohen |
| 2017/0292646 A1 | 10/2017 | Hadas |
| 2018/0014477 A1 | 1/2018 | Ensworth |
| 2018/0027756 A1 | 2/2018 | Kidachi |
| 2018/0098514 A1 | 4/2018 | Socolsky |
| 2018/0110191 A1 | 4/2018 | Keren |
| 2018/0116134 A1 | 5/2018 | Ensworth |
| 2018/0168116 A1* | 6/2018 | Morikoshi ............ A01G 25/02 |
| 2018/0168117 A1 | 6/2018 | Noguchi |
| 2018/0177145 A1 | 6/2018 | Morikoshi |
| 2018/0199524 A1 | 7/2018 | Socolsky |
| 2018/0228097 A1 | 8/2018 | Alkalay |
| 2018/0266576 A1* | 9/2018 | Balet .................... F16K 15/066 |
| 2018/0317406 A1* | 11/2018 | Tsouri ................... A01G 25/02 |
| 2018/0328498 A1* | 11/2018 | Rulli ....................... F16K 7/07 |
| 2018/0338434 A1* | 11/2018 | Wlassich ............ A01G 25/023 |
| 2018/0359962 A1 | 12/2018 | Noguchi |
| 2019/0246577 A1 | 8/2019 | Masarwa |
| 2019/0246578 A1 | 8/2019 | Einav |
| 2019/0335687 A1 | 11/2019 | Socolsky |

FOREIGN PATENT DOCUMENTS

| | | |
|---|---|---|
| CA | 1053726 | 5/1979 |
| CN | 1627994 | 6/2005 |
| CN | 102057823 | 5/2011 |
| CN | 201821716 | 5/2011 |
| CN | 201871438 | 6/2011 |
| CN | 202617872 | 12/2012 |
| CN | 102933071 | 2/2013 |
| DE | 112706 | 5/1975 |
| DE | 3525591 | 1/1986 |
| EP | 0160299 A2 | 11/1985 |
| EP | 0344605 A2 | 12/1989 |
| EP | 0353982 | 2/1990 |
| EP | 0444425 A1 | 9/1991 |
| EP | 0480632 A2 | 4/1992 |
| EP | 0491115 A1 | 6/1992 |
| EP | 0549515 A1 | 6/1993 |
| EP | 636309 A1 | 2/1995 |
| EP | 0709020 A1 | 5/1996 |
| EP | 0730822 A2 | 9/1996 |
| EP | 0493299 | 5/1997 |
| EP | 0872172 A1 | 10/1998 |
| EP | 1541013 A2 | 6/2005 |
| EP | 1701147 | 9/2006 |
| EP | 2952091 A1 | 12/2015 |
| FR | 2366790 | 5/1978 |
| GB | 1498545 | 1/1978 |
| GB | 2057960 A | 4/1981 |
| IL | 42705 A | 3/1976 |
| IL | 53463 A | 3/1983 |
| IL | 97564 A | 7/1996 |
| IL | 221089 | 5/2016 |
| IL | 212105 | 7/2016 |
| IT | 1255120 | 10/1995 |
| JP | 2000228417 | 8/2000 |
| JP | 2016220620 | 12/2016 |
| RU | 2240682 | 1/2005 |
| RU | 2275791 | 3/2006 |
| RU | 2415565 | 4/2011 |
| WO | 9205689 A1 | 4/1992 |
| WO | 9221228 A1 | 12/1992 |
| WO | 9427728 A1 | 12/1994 |
| WO | 1995029761 | 11/1995 |
| WO | 9614939 | 5/1996 |
| WO | 9810635 A1 | 3/1998 |
| WO | 9902273 A1 | 1/1999 |
| WO | 9918771 A1 | 4/1999 |
| WO | 9955141 A1 | 11/1999 |
| WO | 0001219 A1 | 1/2000 |
| WO | 0010378 A1 | 3/2000 |
| WO | 030760 | 6/2000 |
| WO | 136106 A1 | 5/2001 |
| WO | 0156768 A1 | 8/2001 |
| WO | 2001064019 | 9/2001 |
| WO | 0204130 A1 | 1/2002 |
| WO | 2002015670 | 2/2002 |
| WO | 2003045577 A1 | 6/2003 |
| WO | 2003066228 A1 | 8/2003 |
| WO | 2004028778 A1 | 4/2004 |
| WO | 2007046105 | 10/2005 |
| WO | 2006030419 A2 | 3/2006 |
| WO | 2006038246 | 4/2006 |
| WO | 2007068523 A1 | 6/2007 |
| WO | 2010022471 | 3/2010 |
| WO | 2010048063 | 4/2010 |
| WO | 2011092557 | 8/2011 |
| WO | 2011101842 | 8/2011 |
| WO | 2012015655 A1 | 2/2012 |
| WO | 2012137200 | 10/2012 |
| WO | 2012160121 | 11/2012 |
| WO | 2013148672 | 10/2013 |
| WO | 2013155173 A2 | 10/2013 |
| WO | 2013192321 | 12/2013 |
| WO | 2014016832 | 1/2014 |
| WO | 2015023624 | 2/2015 |
| WO | 2015044801 | 4/2015 |
| WO | 2015052107 | 4/2015 |
| WO | 2015098412 | 7/2015 |
| WO | 2016156814 | 10/2016 |
| WO | 2018078521 | 5/2018 |

OTHER PUBLICATIONS

Alapati, Nanda K., Netafim Letter dated Mar. 30, 2012 with enclosure and attachments, 13 pages.

Alapati, Nanda K., Netafim Letter dated Mar. 30, 2012 with enclosure, 6 pages.

Arduini, I., et al., "Influence of Copper on Root Growth and Morphology of Pinus Pinea L. and Pinus Pinaster Ait. Seedlings," Tree Physiology, 15, 1995, pp. 411-415.

ASME 2015 International Design Engineering Technical Conferences & Computers and Information in Engineering Conference, K. Taylor et al, "A Mathematical Model For Pressure Compensating Emitters", Aug. 2-5, 2015, Boston, Massachusetts, USA, 10 pp.

Bernard, H., et al., "Assessment of herbicide leaching risk in two tropical soils of Reunion Island (France)," J Environ Qual 34:534-543, (2005).

Beverage, K., "Drip Irrigation for Row Crops," New Mexico State University, 2001, pp. 1-43.

(56) References Cited

OTHER PUBLICATIONS

Borkow, G., et al., "A Novel Anti-Influenza Copper Oxide Containing Respiratory Face Mask," PLoS One, www.plosone.org, Jun. 2010, vol. 5, Issue 6, pp. 1-8.
Borkow, G., et al., "Copper as a Biocidal Tool," Current Medicinal Chemistry, 2005, 12, 2163-2175.
Borkow, G., et al., "Endowing Textiles with Permanent Potent Biocidal Properties by Impregnating Them with Copper Oxide," ResearchGate, Jan. 2006.
Borkow, G., et al., "Putting copper into action:copperimpregnated products with potent biocidal activities," FASEB J, 18:1728-1730, (2004).
Coder, K., "Tree Root Growth Control Series: Root Control Barriers," The University of Georgia, Mar. 1998, pp. 1-7.
Crawford, M., "Copper-Coated Containers and Their Impact on the Environment," Spin Out, 2003, pp. 76-78.
Crawford, M., "Update on Copper Root Control," Spin Out, 1997.
Diver, S., et al., "Sustainable Small-Scale Nursery Production," ATTRA, Nov. 2001, pp. 1-31.
Duke, K., et al., "Sewer Line Chemical Root Control with Emphasis on Foaming Methods Using Metam-Sodium and Dichiobenil," EPA United States Environmental Protection Agency, Sep. 1995.
Eason, Audra, et al., "Integrated modeling environment for statewide assessment of groundwater vulnerability from pesticide use in agriculture," Pest Manag Sci, 60:739-745 (online:2004).
European Patent Office, Communication Pursuant to Article 94(3) EPC issued in European Application No. 14 836 360.9, dated Feb. 8, 2017, 7 pp.
European Patent Office, Extended European Search Report for European Application No. 13770084.5 dated Feb. 11, 2016, 7 pages.
European Patent Office, Extended European Search Report issued in Application No. 13768209.2, dated Nov. 24, 2015, 10 pp.
European Patent Office, Office Action for European Application No. 10160675.4 dated Mar. 27, 2012, 2 pp.
European Patent Office, Search Report for European Application No. 10160675.4 dated Aug. 6, 2010, 2 pp.
Final Office Action dated Aug. 25, 2015; U.S. Appl. No. 13/430,308; 11 pages.
Final Office Action dated Jul. 21, 2016; U.S. Appl. No. 13/430,308; 9 pages.
Fitch, Even, Tabin & Flannery; Letter, Apr. 23, 2008, 1 p.
Giles-Parker, C, EPA, Pesticide Fact Sheet, pp. 1-4.
http://aasystems.eu/dripper/; Advanced Automation Systems Ltd., Dec. 18, 2015, 12 pp.
http://aasystems.eu/products11.html; Advanced Automation Systems Ltd. (1 p., dated Jun. 20, 2013).
http://metzerplas.com/en-US/50/845/; Meterplas Cooperative Agricultural Organization Ltd., (2 pp., dated Jun. 20, 2013).
Jaffe, E., Netafim Ltd., Patent Dept., Letter with attached Appendices A-B, Aug. 1, 2010, 35 pages.
Jaffe, E., Netafim Ltd., Patent Dept., Letter with attached claim charts, Feb. 4, 2008, 6 pages.
Jaffe, E., Netafim Ltd., Patent Dept., Letter with attached claim charts, Jul. 12, 2009, 4 pages.
Jaffe, E., Netafim Ltd., Patent Dept., Letter with attachment, Feb. 4, 2008, 7 pages.
Jaffe, E., Netafim, Ltd., Patent Dept., Letter with attached invoice, May 7, 2008, 2 pages.
Jiang, W. et al., "Effects of Copper on Root Growth, Cell Division, and Nucleolus of Zea Mays," Biologia Plantarum, 44(1), 2001, pp. 105-109.
Kuhns, L. et al., "Copper Toxicity in Woody Ornamentals," Journal of Arboriculture, Apr. 1976. pp. 68-78.
Mastin, B.J., et al., "Toxicity and bioavailability of copper herbicides (Clearigate, Cutrine-Plus, and copper sulfate) to freshwater animals," Arch Environ Contam Toxicol, 39:445-451, (2000).
Murray-Gulde, C.L., et al., "Algicidal effectiveness of Clearigate, Cutrine-Plus, and copper sulfate and margins of safety associated with their use," Arch Environ Contam Toxicol 42:19-27, (2002).
Netafim International—Netafim USA—Internet site, 2003, 5 pages.
Netafim Ltd., Appendix A, images of Netafim's Drip Net product, 1 page.
Netafim Ltd., Appendix A, marked-up images of Netafim's Ram product, 1 page.
Netafim Ltd., Appendix B, Invoice, Jan. 31, 1991, 1 page.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim USA, RAM Catalog Figures, Jan. 2000, 4 pages.
Netafim USA, Triton X Heavywall Dripperline Catalog, May 2007, 8 pages.
Non-Final Office Action dated Feb. 11, 2016; U.S. Appl. No. 13/430,308; 9 pages.
Patent Cooperation Treaty, Application No. PCT/US2013/033866, International Search Report and Written Opinion dated Jun. 19, 2013, 38 pp.
Patent Cooperation Treaty, International Search Report issued in International Application No. PCT/US2013/046603, dated Sep. 19, 2013, 2 pp.
Patent Cooperation Treaty, International Searching Authority, Notification of Transmittal of the International Search Report and the Written Opinion of the International Searching Authority, or the Declaration, issued in International Application No. PCT/US/2014/054533, dated Dec. 25, 2014, 9 pp.
Patent Cooperation Treaty, International Searching Authority, Notification of Transmittal of the International Search Report and the Written Opinion of the International Searching Authority, or the Declaration, issued in International Application No. PCT/US2018/015516, dated Jun. 28, 2018, 8 pp.
Patent Cooperation Treaty, Notification of Transmittal of the International Search Report and the Written Opinion of the International Searching Authority issued in International Application No. PCT/US2013/033668, dated Jun. 17, 2013, 10 pp.
Patent Cooperation Treaty, Notification of Transmittal of the International Search Report and the Written Opinion of the International Searching Authority issued in International Application No. PCT/US2014/050623, dated Nov. 20, 2014, 17 pp.
Patent Cooperation Treaty, Notification of Transmittal of the International Search Report and the Written Opinion of the International Searching Authority, or the Declaration, Issued in International Application No. PCT/US2017042378, dated Oct. 26, 2017, 7 pp.
Patent Cooperation Treaty, Written Opinion of the International Searching Authority issued in International Application No. PCT/US2013/046603, dated Sep. 19, 2013, 4 pp.
PCT International Application No. PCT/US2013/033866 filed Mar. 26, 2013.
Rain Bird Corporation, Agriculture Irrigation Equipment 1981 Catalog, 3 pages.
Rain Bird Corporation, Drip Watering System 1994 Catalog, 1993, 16 pages.
Rain Bird Corporation, Landscape Irrigation Products 1993-1994 Catalog, Feb. 1993, 5 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, Mar. 2001, 9 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, Jun. 2004, 13 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, Nursery Equipment Catalog 1986/1987, 1986, 3 pages.
Rain Bird Corporation, PC Dripline Pressure Compensating Inline Emitter Tubing Catalog, Oct. 1998, 16 pages.
Rain Bird Corporation, Turf Irrigation Equipment 1982 Catalog, 1982, 4 pages.
Rain Bird Corporation, Turf Irrigation Equipment 1983 Catalog, 1983, 4 pages.

(56) References Cited

OTHER PUBLICATIONS

Rain Bird Corporation, Turf Irrigation Equipment 1985 Catalog, 1985, 3 pages.
Rain Bird Corporation, Turf Irrigation Equipment 1985 Catalog, p. 73, 1985, 3 pages.
Rain Bird Corporation, Turf Irrigation Equipment 1987 Catalog, 1987, 6 pages.
RAM Invoice Jan. 31, 1991.
Schifris, Seba et al., "Inhibition of root penetration in subsurface driplines by impregnating the drippers with copper oxide particles," Irrigation Science (2015) 33:4, pp. 319-324.
Smiley, E. T., "Root Growth Near Vertical Root Barriers," International Society of Arboriculture, 1995, pp. 150-152.
Spera, G., et al., "Subsurface drip irrigation with micro-encapsulated trifluralin. Trifluralin residues in soils and cultivations," Commun Agric Appl Biol Sci 71:161-170, (2006).
State Intellectual Property Office of People'S Republic of China, First Office Action issued in Application No. 201480045002.0, dated Apr. 16, 2018, 20 pp.
State Intellectual Property Office, First Office Action issued in Chinese Application No. 201380016629.9, dated Nov. 4, 2015, 16 pp.
The Clean Estuary Partnership, "Copper Sources in Urban Runoff and Shoreline Activities," TDC Environmental, LLC, 2004, pp. 1-72.
USPTO; U.S. Appl. No. 14/036,881; Notice of Allowance dated Aug. 24, 2017; 7 pages.
USPTO; U.S. Appl. No. 13/839,726; Notice of Allowance dated Sep. 14, 2017; 5 pages.
USPTO; U.S. Appl. No. 13/964,903; Notice of Allowance dated Apr. 5, 2018, 5 pages.
USPTO; U.S. Appl. No. 13/964,903; Notice of Allowance dated Aug. 4, 2017; 11 pages.
USPTO; U.S. Appl. No. 13/964,903; Notice of Allowance dated Sep. 18, 2017; 7 pages.
USPTO; U.S. Appl. No. 14/036,881; Corrected Notice of Allowability dated May 21, 2018, 2 pages.
USPTO; U.S. Appl. No. 14/036,881; Corrected Notice of Allowability dated May 22, 2017; 2 pages.
USPTO; U.S. Appl. No. 14/036,881; Notice of Allowability dated Nov. 29, 2017; 2 pages.
USPTO; U.S. Appl. No. 14/036,881; Notice of Allowability dated Dec. 26, 2017; 2 pages.
USPTO; U.S. Appl. No. 14/036,881; Notice of Allowance dated May 8, 2017; 9 pages.
USPTO; U.S. Appl. No. 14/036,881; Notice of Allowance dated May 9, 2018, 5 pages.
USPTO; U.S. Appl. No. 14/036,881; Notice of Allowance dated Dec. 23, 2016; 8 pages.
USPTO; U.S. Appl. No. 14/036,881; Office Action dated Aug. 2, 2016; 11 pages.
USPTO; U.S. Appl. No. 14/036,881; Office Action dated Dec. 9, 2015; 9 pages.
USPTO; U.S. Appl. No. 14/385,564; Notice of Allowability dated Nov. 29, 2017; 2 pages.
USPTO; U.S. Appl. No. 14/385,564; Notice of Allowability dated Dec. 26, 2017; 2 pages.
USPTO; U.S. Appl. No. 14/385,564; Notice of Allowance dated Aug. 22, 2017; 8 pages.
USPTO; U.S. Appl. No. 14/475,435; Office Action dated Sep. 27, 2017; 9 pages.
USPTO; U.S. Appl. No. 14/518,774; Notice of Allowance dated Jan. 4, 2018; 4 pages.
USPTO; U.S. Appl. No. 14/518,774; Notice of Allowance dated Oct. 26, 2017; 7 pages.
USPTO; U.S. Appl. No. 14/851,545; Office Action dated Oct. 30, 2017; 27 pages.
USPTO; U.S. Appl. No. 14/910,573; Office Action dated Feb. 13, 2018; 10 pages.
USPTO; U.S. Appl. No. 15/331,407; Corrected Notice of Allowability dated Dec. 28, 2017; 2 pages.
USPTO; U.S. Appl. No. 15/331,407; Notice of Allowability dated Nov. 30, 2017; 2 pages.
USPTO; U.S. Appl. No. 15/331,407; Notice of Allowance dated Oct. 27, 2017; 9 pages.
USPTO; U.S. Appl. No. 15/331,407; Office Action dated Apr. 27, 2017; 7 pages.
USPTO; U.S. Appl. No. 15/344,843; Corrected Notice of Allowability dated Dec. 28, 2017; 2 pages.
USPTO; U.S. Appl. No. 15/344,843; Notice of Allowability dated Nov. 30, 2017; 2 pages.
USPTO; U.S. Appl. No. 15/344,843; Notice of Allowance dated Oct. 16, 2017; 7 pages.
USPTO; U.S. Appl. No. 15/650,379; Office Action dated May 18, 2018, 8 pages.
USPTO; U.S. Appl. No. 14/851,545; Office Action dated Jul. 3, 2018; 29 pages.
USPTO; U.S. Appl. No. 11/394,755, Office Action dated Aug. 14, 2008; 9 pages.
USPTO; U.S. Appl. No. 11/394,755, Office Action dated Feb. 7, 2008; 18 pages.
USPTO; U.S. Appl. No. 11/394,755, Office Action dated Jul. 17, 2007; 16 pages.
USPTO; U.S. Appl. No. 11/394,755, Office Action dated Jul. 17, 2009; 8 pages.
USPTO; U.S. Appl. No. 11/394,755, Office Action dated Mar. 31, 2009; 13 pages.
USPTO; U.S. Appl. No. 11/394,755, Office Action dated May 12, 2011; 15 pages.
USPTO; U.S. Appl. No. 11/394,755; Office Action dated Dec. 19, 2011; 10 pages.
USPTO; U.S. Appl. No. 12/347,266, Office Action dated Mar. 7, 2011; 17 pages.
USPTO; U.S. Appl. No. 12/347,266, Office Action dated Nov. 17, 2010; 15 pages.
USPTO; U.S. Appl. No. 12/347,266, Office Action dated Sep. 7, 2010; 5 pages.
USPTO; U.S. Appl. No. 12/367,295, Office Action dated Feb. 11, 2011; 14 pages.
USPTO; U.S. Appl. No. 12/367,295, Office Action dated Jul. 15, 2011; 16 pages.
USPTO; U.S. Appl. No. 12/367,295; Office Action dated Jun. 8, 2012; 21 pages.
USPTO; U.S. Appl. No. 12/495,178, Office Action dated Feb. 3, 2010; 20 pages.
USPTO; U.S. Appl. No. 12/495,178; Office Action dated Apr. 18, 2014; 12 pages.
USPTO; U.S. Appl. No. 12/495,178; Office Action dated Jun. 21, 2012; 8 pages.
USPTO; U.S. Appl. No. 12/495,178; Office Action dated Mar. 11, 2015; 6 pages.
USPTO; U.S. Appl. No. 12/495,178; Office Action dated Nov. 18, 2014; 8 pages.
USPTO; U.S. Appl. No. 12/495,178; Office Action dated Oct. 6, 2015; 8 pages.
USPTO; U.S. Appl. No. 12/495,193, Office Action dated Jan. 6, 2012; 18 pages.
USPTO; U.S. Appl. No. 12/495,193, Office Action dated May 11, 2011; 19 pages.
USPTO; U.S. Appl. No. 12/495,193; Advisory Action dated Sep. 5, 2013; 3 pages.
USPTO; U.S. Appl. No. 12/495,193; Notice of Allowance dated Feb. 10, 2017; 7 pages.
USPTO; U.S. Appl. No. 12/495,193; Notice of Allowance dated May 4, 2017; 7 pages.
USPTO; U.S. Appl. No. 12/495,193; Notice of Allowance dated Oct. 14, 2016; 7 pages.
USPTO; U.S. Appl. No. 12/495,193; Office Action dated Apr. 18, 2014; 23 pages.
USPTO; U.S. Appl. No. 12/495,193; Office Action dated Aug. 29, 2016; 7 pages.

(56) References Cited

OTHER PUBLICATIONS

USPTO; U.S. Appl. No. 12/495,193; Office Action dated Jan. 15, 2015; 11 pages.
USPTO; U.S. Appl. No. 12/495,193; Office Action dated Jun. 18, 2013; 13 pages.
USPTO; U.S. Appl. No. 12/495,193; Office Action dated Oct. 1, 2015; 9 pages.
USPTO; U.S. Appl. No. 13/430,249; Notice of Allowance dated Apr. 14, 2016; 7 pages.
USPTO; U.S. Appl. No. 13/430,249; Notice of Allowance dated Sep. 19, 2016; 6 pages.
USPTO; U.S. Appl. No. 13/430,249; Office Action dated Mar. 24, 2015; 10 pages.
USPTO; U.S. Appl. No. 13/430,249; Office Action dated Oct. 26, 2015; 10 pages.
USPTO; U.S. Appl. No. 13/800,354; Office Action dated Sep. 25, 2014; 13 pages.
USPTO; U.S. Appl. No. 13/839,726; Notice of Allowance dated Aug. 15, 2016; 5 pages.
USPTO; U.S. Appl. No. 13/839,726; Notice of Allowance dated Dec. 1, 2016; 5 pages.
USPTO; U.S. Appl. No. 13/839,726; Notice of Allowance dated Dec. 31, 2015; 5 pages.
USPTO; U.S. Appl. No. 13/839,726; Office Action dated Apr. 26, 2016; 4 pages.
USPTO; U.S. Appl. No. 13/839,726; Office Action dated Mar. 20, 2017; 4 pages.
USPTO; U.S. Appl. No. 13/839,726; Office Action dated May 28, 2015; 5 pages.
USPTO; U.S. Appl. No. 13/839,726; Office Action dated May 30, 2017; 4 pages.
USPTO; U.S. Appl. No. 13/964,903; Office Action dated Jun. 3, 2015; 21 pages.
USPTO; U.S. Appl. No. 13/964,903; Office Action dated Mar. 7, 2016; 21 pages.
USPTO; U.S. Appl. No. 14/047,489; Office Action dated Jun. 29, 2015; 7 pages.
USPTO; U.S. Appl. No. 14/047,489; Office Action dated Oct. 7, 2015; 9 pages.
USPTO; U.S. Appl. No. 14/139,217; Office Action dated Apr. 8, 2015; 9 pages.
USPTO; U.S. Appl. No. 14/139,217; Office Action dated Sep. 18, 2015; 11 pages.
USPTO; U.S. Appl. No. 14/385,564; Office Action dated Aug. 10, 2016; 9 pages.
USPTO; U.S. Appl. No. 14/385,564; Office Action dated Mar. 10, 2017; 8 pages.
USPTO; U.S. Appl. No. 14/475,435; Office Action dated Jan. 26, 2017; 10 pages.
USPTO; U.S. Appl. No. 14/475,435; Office Action dated Jul. 20, 2016; 9 pages.
USPTO; U.S. Appl. No. 14/518,774; Office Action dated May 10, 2017; 8 pages.
USPTO; U.S. Appl. No. 14/851,545; Office Action dated Apr. 24, 2017; 20 pages.
USPTO; U.S. Appl. No. 14/910,573; Office Action dated Jun. 27, 2017; 10 pages.
USPTO; U.S. Appl. No. 15/344,843; Office Action dated Apr. 28, 2017; 7 pages.
USPTO; U.S. Appl. No. 13/964,903; Office Action dated Oct. 31, 2016; 22 pages.
Wagar, J. Alan, et al., "Effectiveness of Three Barrier Materials for Stopping Regenerating Roots of Established Trees," Journal of Arboriculture, 19(6), Nov. 1993, pp. 332-338.
Westgate, Philip J., "Preliminary Report on Copper Toxicity and Iron Chlorosis in Old Vegetable Fields," Florida State Horticultural Society, 1952, pp. 143-146.
DIG® Irrigation Product Catalog , <www.digcorp.com>, 2018, 72 pages.
DIG® Irrigation Product Catalog, <www.digcorp.com>, 2012, 32 pages.
DIG® Irrigation Product Catalog, <www.digcorp.com>, 2016, 72 pages.
Irritec® On Line Drippers iDrop®, Drritec S.p.A, <www.irritec.com>, available prior to May 15, 2017, 2 pages.
Irritec® Product Catalog and Price List, Irritec USA Inc., <www.irritec.com>, 2016, 66 pages.
Irritec™ USA iDrop™ PCDS, Irritec USA Inc., <www.irritecusa.com>, available prior to May 15, 2017, 2 pages.
Jain® Button Emitters, Jain Irrigation Inc., <www.jainsusa.com>, available prior to May 15, 2017, 2 pages.
Jain® Emission Devices, Jain Irrigation Systems Ltd., <www.jainsusa.com>, available prior to May 15, 2017, pp. 171-182.
Jain® Landscape Catalog , Jain Irrigation, Inc., <www.jainsusa.com>, 2016, 102 pages.
Jain® Online Emitters, Jain Irrigation Systems Ltd., <www.jainsusa.com>, available prior to May 15, 2017, 2 pages.
Netafim™ Non-Pressure Compensating Drippers, Netafim USA, <www.netfimusa.com>, available prior to May 15, 2017, 2 pages.
Netafim™ Point Source Emitters, Netafim USA, <www.netafimusa.com>, available prior to May 15, 2017, 4 pages.
Netafim™ Pressure Compensating (PC) Spray Stakes, Netafim USA, <www.netafimusa.com>, as of Apr. 2016, 12 pages.
Netafim™ Pressure Compensating Drippers, Netafim USA, <www.netafimusa.com>, Apr. 2016, 2 pages.
Netafim™ Pressure Compensating Drippers, Netafim USA, <www.netafimusa.com>, Jun. 2018, 2 pages.
Photograph of DIG® Product No. PCA-003CV, available prior to May 15, 2017, 1 page.
Photograph of Irritec® Product No. A6-WPC2BB, available prior to May 15, 2017, 1 page.
Photograph of Irritec® Product No. A6-WPC3BB, available prior to May 15, 2017, 1 page.
Photograph of Jain® Product No. CTTPC2-CNL, available prior to May 15, 2017, 1 page.
Photograph of Jain® Product No. CTTPC4-CNL, available prior to May 15, 2017, 1 page.
Photograph of Netafim™ Product No. SPCV10, available prior to May 15, 2017, 1 page.
Photograph of Netafim™ Product No. Techflow Emitter WPC20, available prior to May 15, 2017, 1 page.
Photograph of Netafim™ Product No. WPC10, available prior to May 15, 2017, 1 page.
Photograph of Netafim™ Woodpecker Junior Product No. 01WPCJL4, available prior to May 15, 2017, 1 page.
Photograph of Toro® Product No. A6-WPC2BB, available prior to May 15, 2017, 1 page.
Price Book, Oct. 2015, Rivulis Irrigation, Oct. 2015 (Revised Apr. 2016), <rivulis.com>, 116 pages.
Toro® NGE® AL Anti-Drain Pressure Compensating Emitter, The Toro Company, <www.toro.com>, 2012, 2 pages.
Toro® NGE® Emitters, The Toro Company, <www.toro.com>, 2018, 2 pages.
Toro® NGE® New Generation Emitters, The Toro Company, <www.toro.com>, 2013, 2 pages.
Toro® NGE® SF Self-flushing Pressure Compensating Emitter, The Toro Company, <www.toro.com>, 2012, 2 pages.
Toro® Turbo-SC® Plus Pressure-compensating Emitter, The Toro Company, <www.toro.com>, 2009, 2 pages.
USPTO; U.S. Appl. No. 15/650,379; Notice of Allowance dated Feb. 19, 2019; (pp. 1-5).
USPTO; U.S. Appl. No. 13/964,903; Notice of Allowance dated Mar. 26, 2019; (pp. 1-5).
USPTO; U.S. Appl. No. 15/650,379; Notice of Allowance dated Mar. 26, 2019; (pp. 1-5).
USPTO; U.S. Appl. No. 14/851,545; Notice of Allowance datd Apr. 17, 2019; (pp. 1-9).
USPTO; U.S. Appl. No. 14/036,881; Notice of Allowance dated Jun. 21, 2019; (pp. 1-6).
USPTO; U.S. Appl. No. 14/910,573; Office Action dated May 6, 2019; (pp. 1-11).

(56) References Cited

OTHER PUBLICATIONS

USPTO; U.S. Appl. No. 15/853,135; Notice of Allowance dated May 20, 2019; (pp. 1-10).
Brazilian Patent and Trademark Office, Search Report dated Nov. 19, 2018 for Brazilian Patent Application No. BR 11 2014 023843-0, 2 pages.
Brazilian Patent and Trademark Office, Technical Examination Report dated Nov. 19, 2018 for Brazilian Patent Application No. BR 11 2014 023843-0, 9 pages.
CETESB and SINDIPLAST, Environmental Guide of the Plastic Materials Recycling and Processing Industry [electronic resource], Technical elaboration: Gilmar do Amaral et al., Collaborators: Andre H.C. Botto e Souza et al., 2011. Retrieved from the Internet: <URL: http://file.sindiplast.org.br/download/guia_ambiental_internet.pdf>, 91 pages.
Dixieline Lumber & Home Centers Catalog, DIG Irrigation Products Drip Tubing, 2003, p. 13.
Eurodrip U.S.A., Inc., 2009 Irrigation Products Catalog, pp. 4-5, 4 pages.
Eurodrip U.S.A., Inc., Products Guide, copyright date Nov. 2007, 2 pages.
European Patent Application No. 18172143.2, Extended European Search Report, dated Oct. 15, 2018, 9 pages.
European Patent Office, Communication Pursuant to Article 94(3) EPC issued in European Application No. 13 768 209.2, dated Jan. 4, 2019, 5 pp.
Hunter Industries, Drip Design Guide, Dec. 2012, 32 pages.
Jain Irrigation Inc., 2009 Product Catalog, pp. 12-13, copyright date 2009 (revised Oct. 2008), 4 pages.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
NDS Inc., AGRIFIM Drip and Micro Irrigation Catalog, Jan. 2004, 3 pages.
Netafim USA, Landscape & Turf Division Product Catalog, Aug. 2004, 36 pages.
Netafim, RAM Pressure Compensating Dripperline brochure, Feb. 1997, 4 pages.
Photograph of Toro® Product No. DPC08-MA-Red, Jun. 22, 2012, 1 page.
Photographs of an in-line cylindrical drip emitter on sale or publicly disclosed more than a year before the filing of the instant application, 2 pages.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Rain Bird Corporation, Rain Bird PC Dripline brochure, copyright date Nov. 2000, 12 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.
Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.
Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright date Aug. 2003, pp. 106-107.
Rain Bird® Nursery Equipment Catalog 1986-1987, D32304, copyright date 1986, p. 13.
Rain Bird® XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird® XFD Dripline with Greater Flexiblity, D39994B, copyright date Jan. 2012, 2 pages.
Rain Bird® XFS Dripline with Copper Shield™ Technology, D39978B, copyright date Jan. 2012, 2 pages.
Rain Tape Design Guide, Rain Bird®, D35252, document was published more than a year before the filing date of the instant application, 5 pages.
Siplast/Irritec Multibar Pressure Compensated Coextruded Dripline, Jul. 22, 2005, 4 pages.
The Toro Company, 2000-2001 Irrigation Products Catalog, p. 28, copyright date Oct. 1999, 3 pages.
The Toro Company, Drip In Classic Turbulent Flow Dripline brochure, Jun. 2014, 4 pages.
The Toro Company, Drip in PC Brown Dripline brochure, 2015, 2 pages.
USPTO; U.S. Appl. No. 13/964,903; Notice of Allowance dated Sep. 26, 2018; (pp. 1-5).
UPSTO; U.S. Appl. No. 13/964,903; Notice of Allowance dated Dec. 14, 2018; (pp. 1-5).
USPTO; U.S. Appl. No. 14/036,881; Notice of Allowance dated Aug. 30, 2018; (pp. 1-6).
USPTO; U.S. Appl. No. 14/851,545; Office Action dated Oct. 29, 2018; (pp. 1-32).
USPTO; U.S. Appl. No. 14/910,573; Office Action dated Sep. 26, 2018; (pp. 1-11).
USPTO; U.S. Appl. No. 15/650,379; Notice of Allowance dated Oct. 24, 2018; (pp. 1-7).
USPTO; U.S. Appl. No. 14/910,573; Notice of Allowance dated Sep. 3, 2019; (pp. 1-11).
USPTO; U.S. Appl. No. 15/665,848; Office Action dated Aug. 30, 2019; (pp. 1-12).
USPTO; U.S. Appl. No. 14/910,573; Notice of Allowance dated Dec. 23, 2019; (pp. 1-5).
Eco iMat LLC dba ecorain® USA, iMat Solution, <www.ecorainusa.>, illustrating a product available since Nov. 25, 2015, 6 pages.
ECO Rain AG, iMat® Irrigation Mat, <http://www.ecorain.de/files/imat_irrigation_mat.pdf>, illustrating a product available since Sep. 18, 2016, 8 pp.
ecorain USA, iMat FAQ document, illustrating a product available since 2017, 6 pp.
Encyclopaedia Britannica, Inc., "Peristalsis," Nov. 30, 2017, [online]. Retrieved from the Internet: <URL: https://www.britannica.com/print/article/452053 >, 2 pages.
European Patent Office, Extended European Search Report for European Application No. 17831631.1, dated Feb. 3, 2020, 9 pp.
USPTO; U.S. Appl. No. 15/665,848; Office Action dated Jan. 8, 2020; (pp. 1-11).
USPTO; U.S. Appl. No. 15/858,685; Office Action dated Jan. 14, 2020; (pp. 1-10).
USPTO; U.S. Appl. No. 15/881,285; Office Action dated Dec. 30, 2019; (pp. 1-12).
USPTO; U.S. Appl. No. 16/532,006; Office Action dated Jan. 6, 2020; (pp. 1-10).

* cited by examiner

DRIP EMITTER WITH CHECK VALVE

FIELD

The subject matter is directed to drip emitters and, more particularly, to a drip emitter with a check valve.

BACKGROUND

Irrigation systems are used to provide controlled watering to vegetation zones and specific plants. There are various types of irrigation emission devices that can be used in irrigations systems. One type is an on-line drip emitter. An on-line drip emitter attaches onto a supply line and coverts the higher pressure flow in the supply line to a drip-like emission. Exemplary flow rates for drip emission can be in the range of 0.5 to 24.0 gallons per hour, and preferably about 0.5 to 2.0 gallons per hour.

In a typical irrigation system, there is a control valve upstream from the emission devices to control the flow to the emission devices. That is, during an irrigation event, the control valve is opened to allow flow to the emission devices, and conversely, between irrigation events, the control valve prohibits flow to the emission devices. An irrigation system may include many drip emitters mounted at selected positions along the length of a supply line to deliver irrigation water to a large number of specific points, including directly to a plurality of individual plants.

When a drip irrigation event is over, water can remain in the supply line from the control valve to the drip emitters. This remaining water can slowly escape through the drip emitters if there is nothing to prevent such flow. This is especially the case when the drip emitters are at a lower elevation than the control valve. This can cause unnecessary water use and overwatering.

There are on-line drip emitters available that include a check valve to prevent water from escaping from the supply line between irrigation events. However, most of these designs separate the pressure reduction feature from the pressure compensation feature or use a single diaphragm to cover all three functions of (1) a check valve, (2) pressure compensation and (3) sealing of the tortuous path. It would be beneficial to have a design that would permit the pressure compensation feature to be associated with the pressure reduction feature. It would be further beneficial to be able to adjust the hold-back capability of the check valve while also being able to minimize any changes to the pressure compensation feature of the emitter.

DESCRIPTION OF PREFERRED EMBODIMENTS

Figure 1:
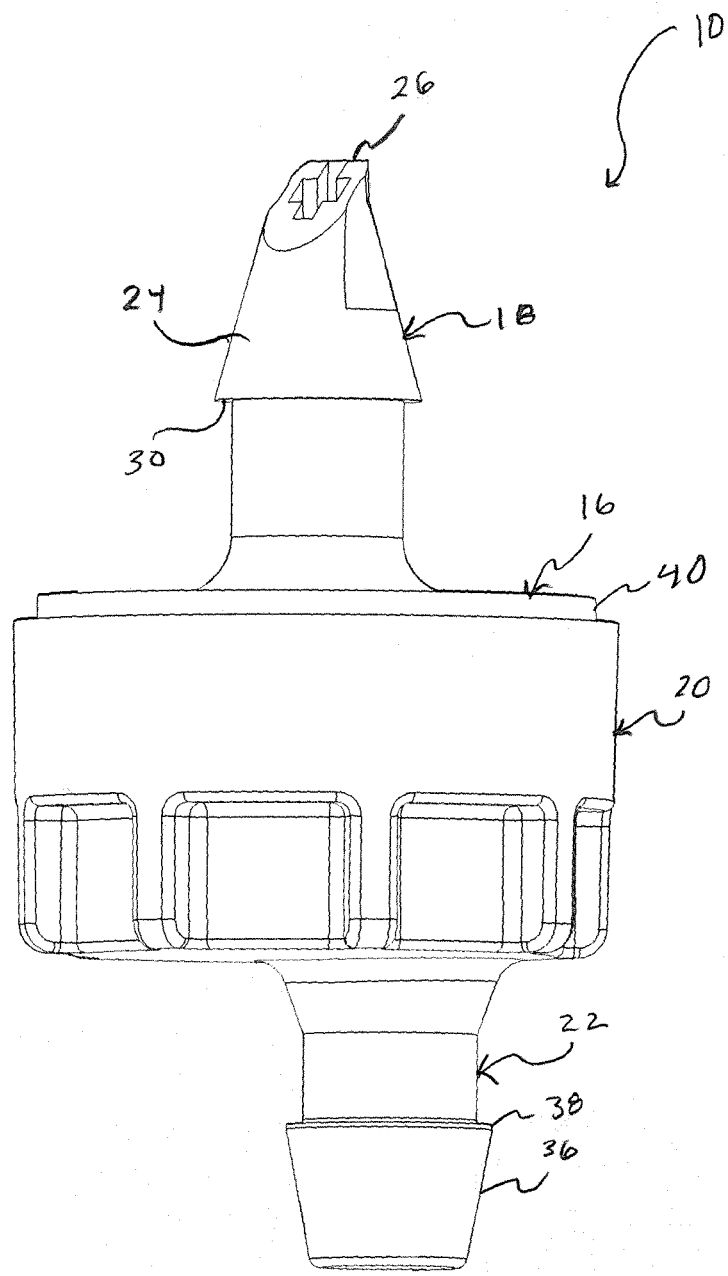
FIG. 1 is a perspective view of a drip emitter embodying features of the present invention.

With reference to FIG. 1, there is illustrated an online drip emitter 10 that can be mounted to a supply line 12 (see FIG. 3) to deliver irrigation water at a low volume, substantial trickle or drip flow rate. The drip emitter 10 includes a check valve 14 (FIG. 3) to prevent the drainage of unused water in the supply line 12 after an irrigation event. More specifically, where there are elevational changes on the terrain being irrigated, emitters downhill of high points in the system tend to drain water from the supply line 12. This causes an unnecessary use of water and overwatering. The check valve prevents drainage of water from the supply lines through the drip emitters between irrigation events.

Figure 3:
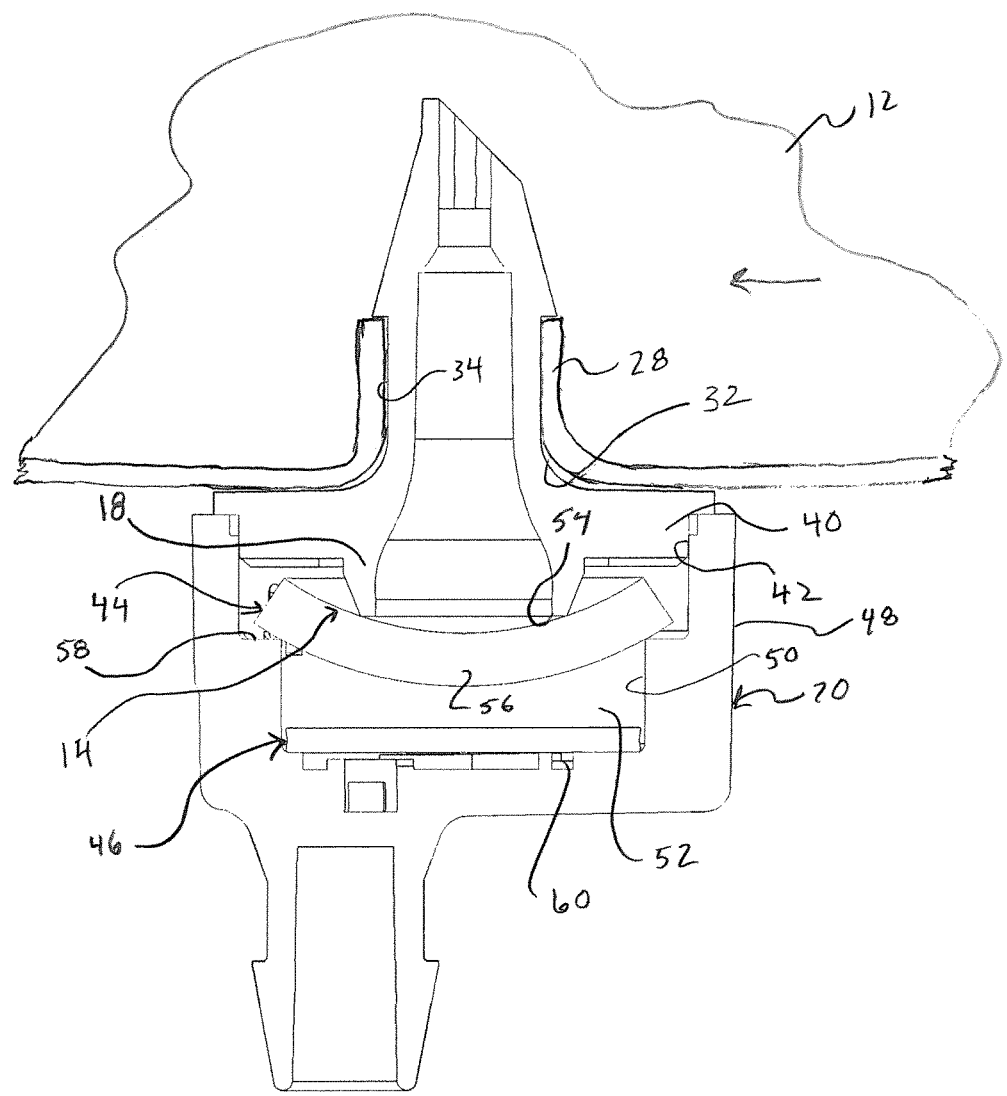
FIG. 3 is a central cross-section of the emitter of FIG. 1.

The drip emitter 10 includes a cover 16 with an inlet tube 18 and a body 20 with an outlet tube 22. The inlet tube 18 terminates with a barb 24 with a penetrating edge 26 that assists to puncture a sidewall 28 (FIG. 3) of the supply line 12 for press-on puncture type attachment to the supply line 12. In some cases, the supply line 12 has been pre-punctured with a smaller hole using a puncture tool. The barb 24 includes a step 30 that prohibits the barb 24 from releasing from the supply line 12 (FIG. 3). The supply line 12 defines a hole 32 through which the inlet tube 18 extends into, and the material defining the hole 32 of the supply line seals against a wall 34 (FIG. 3) of the inlet tube 18. An example of a drip emitter connecting to a supply line is shown in U.S. Pat. No. 5,820,029, which is patent incorporated by its entirety herein. This patent is owned by the assignee of this application.

The outlet tube 22 also terminates with a barb 36. The outlet tube 22 can extend into a tube that can be used to further locate emission of the water from the emitter 10 for precise irrigation. The barb 36 includes an annular edge 38 that bites into the tube to prevent the tube from releasing from the outlet tube 22.

The cover 16 includes a disc-shaped base 40 that can be press-fit into an open end 42 (FIG. 3) of the body 20. The body 20 and cover 16 can be secured together such as by welding or use of an adhesive. The body 20 and cover 16 can be plastic molded components.

Figure 2:
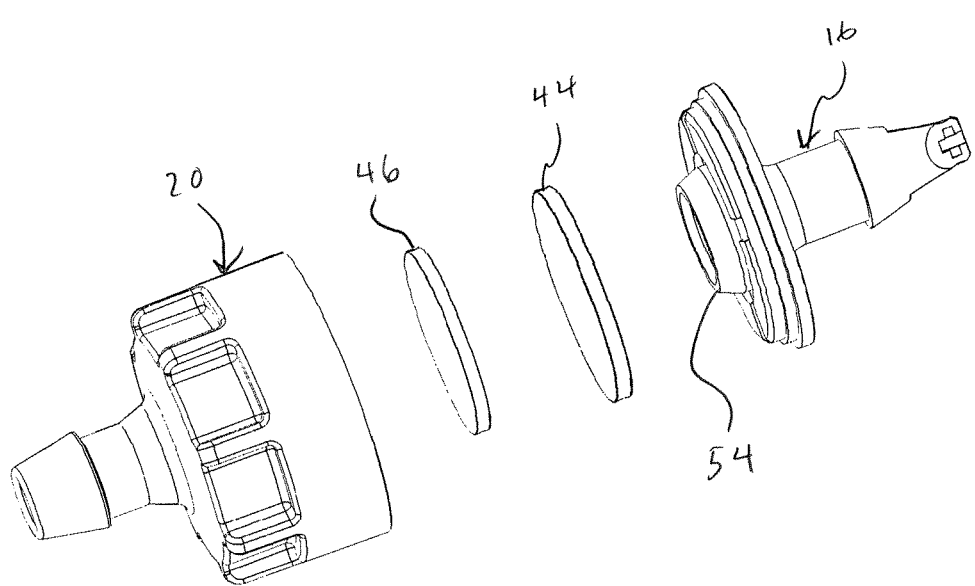
FIG. 2 is an exploded view of the drip emitter of FIG. 1.

As shown in FIG. 2, the emitter 10 includes a first diaphragm 44 that cooperates with the cover 16 to provide the check valve 14 to prevent leakage from the emitter 10 between irrigation events. The emitter 10 also includes a second diaphragm 46 that cooperates with the body 20 to provide pressure compensation. The pressure compensation ensures that the emission rate of the emitter 10 is consistent when the pressure in the supply line 12 fluctuates.

As shown in FIG. 3, the body 20 has a generally cup-shaped form with an upstanding wall forming a cylindrical exterior wall 48 and a cylindrical, stepped interior wall 50. The body 20 and the cover 16 combine to define an interior chamber 52. The check valve 14 resides in the interior chamber 52 and includes a valve seat 54 at an end of the inlet tube 18 in the interior chamber 52 and the first diaphragm 44. The valve seat 54 can have an inner diameter larger than the inner diameter of the inlet tube 18 outside the interior chamber 52. The check valve 14 is shown in the closed position with a center region 56 of the first diaphragm 44 engaged with the valve seat 54.

The first diaphragm 44 is circular in shape and rests on an annular ledge 58 formed about a perimeter of the interior chamber 52 by the stepped interior wall 50. The first diaphragm 44 is positioned along the interior chamber 52 defined by the ledge 58 and has a thickness such that the valve seat 54 causes the first diaphragm 44 to bow downstream in the interior chamber 52 to exert a predetermined amount of sealing pressure on the valve seat 54 for holding back water in the supply line 12 between irrigation events. The sealing pressure could be in a range of about 3 to 6 psi and preferably about 4.3 psi. The sealing pressure could be higher or lower depending on the preloaded pressure of the first diaphragm 44 and depending on the resiliency of the material of the first diaphragm 44 material. The first diaphragm 44 could be made of silicone and have a thickness of 0.060 inches.

The material hardness and thickness dimension could be changed to alter the hold-back capability of the check valve. For instance, if the thickness of the first diaphragm 44 is reduced, and with everything else remaining the same, the check valve 14 would have a lower hold-back pressure. On the other hand, if the thickness is increased, then the hold-back pressure would be higher. The same could be done with the material hardness and/or a combination of material hardness and thickness. Also, the interference between the first diaphragm 44 and valve seat 54 could be changed by altering the length that the inlet tube 18 extends into the interior chamber 52 to either increase (longer extension) or decrease (shorter extension) the hold-back pressure. Further, the inner diameter of the inlet tube 18 can be changed to manipulate the response time of the first diaphragm 44. The inner diameter could be made larger to increase opening response time, or smaller to decrease opening response time. When the supply pressure exceeds the sealing pressure, such as during an irrigation event, the water pushes the first diaphragm 44 away from the valve seat 54, and water is allowed into the interior chamber 52.

The second diaphragm 46 is located downstream of the first diaphragm 44. The second diaphragm 46 lays on a bottom of the interior chamber 52 and is not structurally restricted from upstream movement. The supply pressure in the interior chamber 52 causes the second diaphragm 46 to seat on the bottom of the interior chamber 52. The body 20 defines a tortuous path 60 at the bottom of the interior chamber 52. The tortuous path 60 reduces the inlet pressure of the water flowing into the emitter 10. Water pressure in the interior chamber 52 acts on the second diaphragm 46 to cause the second diaphragm 46 to seal the tortuous path 60, as discussed further below.

Figure 4:
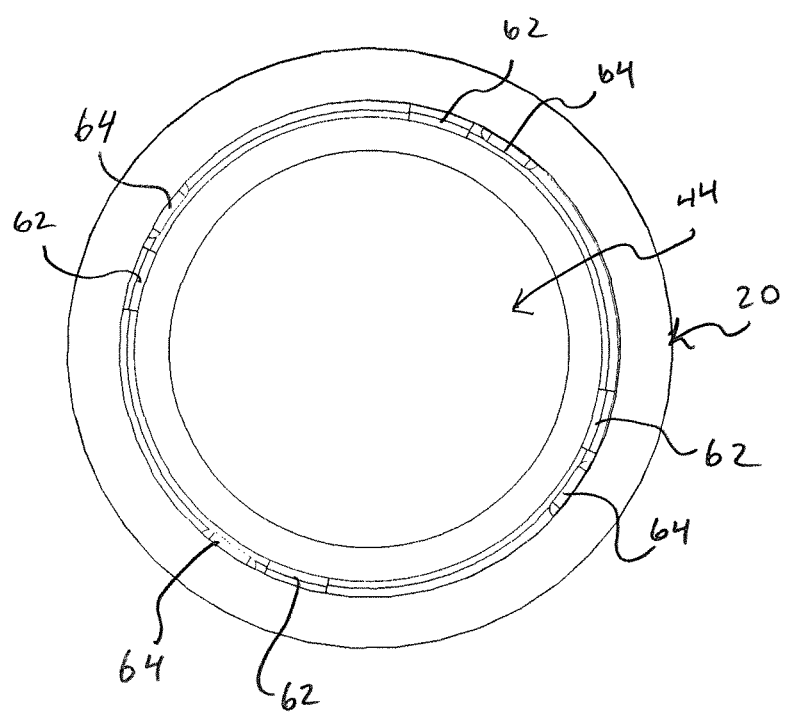
FIG. 4 is a plan view of the emitter of FIG. 1 with its cover removed.
Figure 5:
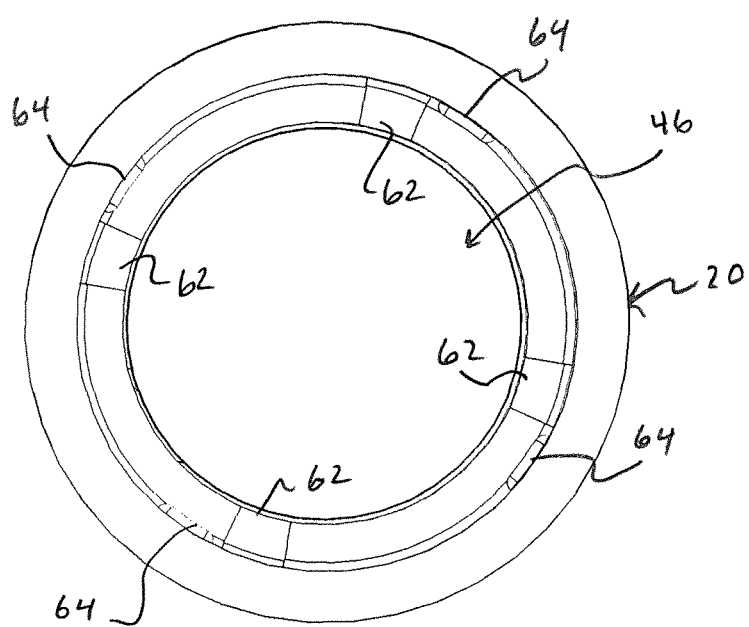
FIG. 5 is a plan view of the emitter of FIG. 1 with its cover and first diaphragm removed.

With reference to FIG. 4, the emitter 10 is shown with the cover 16 removed. The body 20 defines four passages 62 that allow water to pass by the first diaphragm 44 to the interior chamber 52 between the first diaphragm 44 and the second diaphragm 46. The passages 62 form breaks in the annular ledge 58 that supports the first diaphragm 44. The body 20 also defines four vertical ribs 64, each adjacent to one of the passages 62. The ribs 64 maintain the first diaphragm 44 centered in the interior chamber 52 so that proper sealing occurs with the valve seat 54 and so that the first diaphragm 44 does not shift in the interior chamber 52 and block one or more of the passages 62. Turning to FIG. 5, the emitter 10 is shown with the cover 16 and first diaphragm 44 removed. The passages 62 and ribs 64 discussed above are shown about the perimeter of the interior chamber 52.

Figure 6:
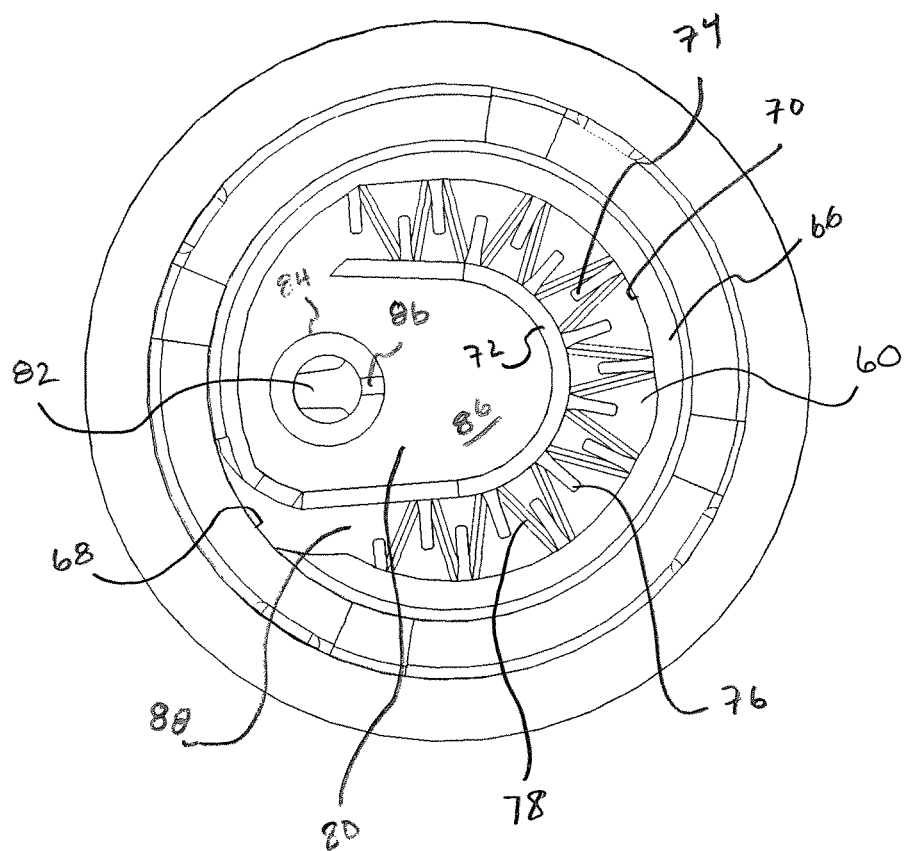
FIG. 6 is a plan view of the emitter of FIG. 1 with its cover and first and second diaphragms removed.

As shown in FIG. 6, the second diaphragm 46 rests on an annular ledge 66 about the perimeter of the interior chamber 52. The ledge 66 includes a break that forms a passage 68 for water to flow past the second diaphragm 46 and to the tortuous path 60. The tortuous path 60 extends about the bottom of the body 20 in a generally circular or U-shaped pattern. The tortuous path 60 consists of an outer wall 70 (which forms the annular ledge 66 on its top) and an inner wall 72 spaced inward of the outer wall 70. It also includes an outer set of baffles 74 extending inward from the outer wall 70 and an inner set of baffles 76 extending outward from the inner wall 72. The baffles of the outer and inner sets 74,76 are staggered relative to one another such that the inner baffles 76 are directed between the outer baffles 74. The baffle sets 74,76 cross a center line through the tortuous path 60. The baffles 74,76 cause the water to flow in a direction changing laterally back-and-forth, resulting in velocity reduction and turbulence to achieve a substantial pressure reduction.

A series of weirs 78 also extends from a base of the outer baffles 74 to a base of the inner baffles 76. The baffles 74,76 all have the same height, and the weirs 78 are shorter than the baffles 74,76. The weirs 78 cause the water flowing through the tortuous path 60 to be deflected vertically, thereby imparting an up-and-down direction change to the flow. The combined effects of the baffles 74,76 and the weirs 78 create a three dimensional tortuous flow path which is of relatively large cross-sectional size and wherein the water repeatedly changes direction back-and-forth and up-and-down to result in a substantial and relatively increased pressure reduction over a relatively short channel length.

The tortuous path 60 terminates to allow water to flow into an inner discharge chamber 80. An outlet 82 leading to the outlet tube 22 is located in the inner discharge chamber 80. The outlet 82 includes a raised circular boss 84 projecting upwardly from a floor 86 of the inner discharge chamber 80. The boss 84 defines an upwardly open discharge metering groove 86 that extends across a wall of boss 84 for discharge flow of the water from the discharge chamber 80 to the outlet 82 of the emitter 10.

As water flows into the interior chamber 52, the second diaphragm 46 seals on the outer and inner walls 70, 72 of the tortuous path 60. As the water pressure increases further in the interior chamber 52, the second diaphragm 46 moves towards the boss 84 and its metering groove 86. This movement can cause access to the outlet 82 to be reduced. Eventually, if the pressure increases enough, the second diaphragm 46 will engage the boss 84, and the water will flow only through the metering groove 86. With further increase in pressure, the effective cross sectional size of the metering groove 86 may be reduced as the second diaphragm 46 is pressure-forced partially into the metering groove 86. The emitter 10 thus provides for pressure compensation by varying the access to the outlet 82 and the effective size of the metering groove 86 as a function of inlet pressure, to achieve a substantially constant discharge outlet flow over a range of typical water supply pressures. Moreover, due to the increased pressure drop created by the three-dimensional tortuous path 60, the discharge metering groove 86 can be of relatively large size, yet still provide the desired pressure regulation function while further reducing the possibility of clogging during use.

The second diaphragm 46 is disc-like in shape and could be made of silicone and have a thickness of 0.029 inches.

The material and thickness could be altered to change the pressure compensation range.

During an irrigation event, water flows through the supply line 12 and into the drip emitter 10 through the inlet tube 18. The supply pressure exceeds the threshold of the check valve 14 and causes the first diaphragm 44 to move away from the valve seat 54. The water then flows past the first diaphragm 44 through the passages 62 and into the interior chamber 52 between the first and second diaphragms 44, 46. The pressure of the water in the interior chamber 52 seals the second diaphragm 46 against the tortuous path 60. Water flows through the break 68 about the second diaphragm 46 and to an inlet 88 of the tortuous path 60, through the tortuous path 60 and out through outlet 82 and the outlet tube 22. The second diaphragm 46 will operate to compensate for pressure fluctuations in the supply pressure. The combination of the pressure reduction and pressure compensation enables the flow emitted from the emitter to be in the desired amount. For example, the desired amount could be in the range of about 0.5 to 2 gallons per hour. Upon conclusion of the irrigation event, the supply water will become virtually unpressurized, and the check valve 14 will seal against the valve seat 54 and prevent water in the supply line 12 from draining out through the drip emitter 10.

Figure 7:
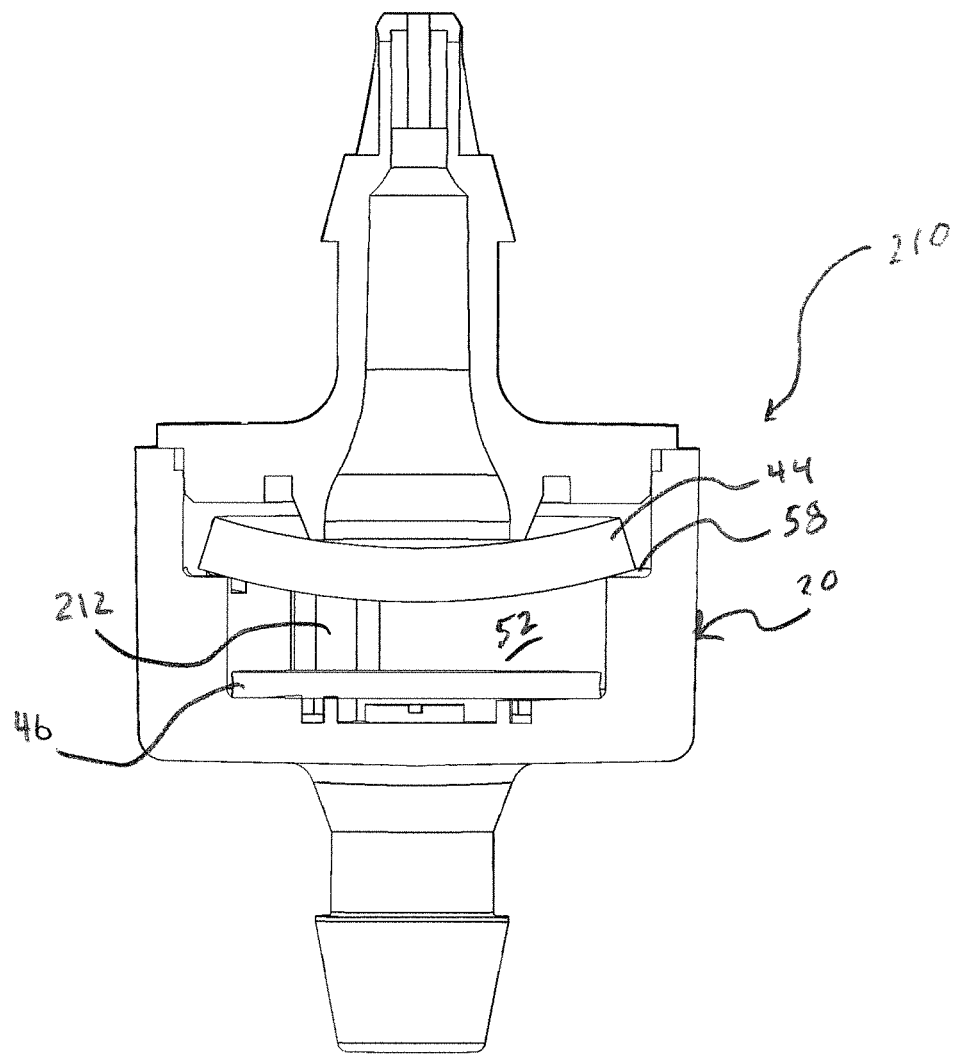
FIG. 7 is a central cross-section of a first alternative drip emitter embodying features of the present invention.
Figure 8:
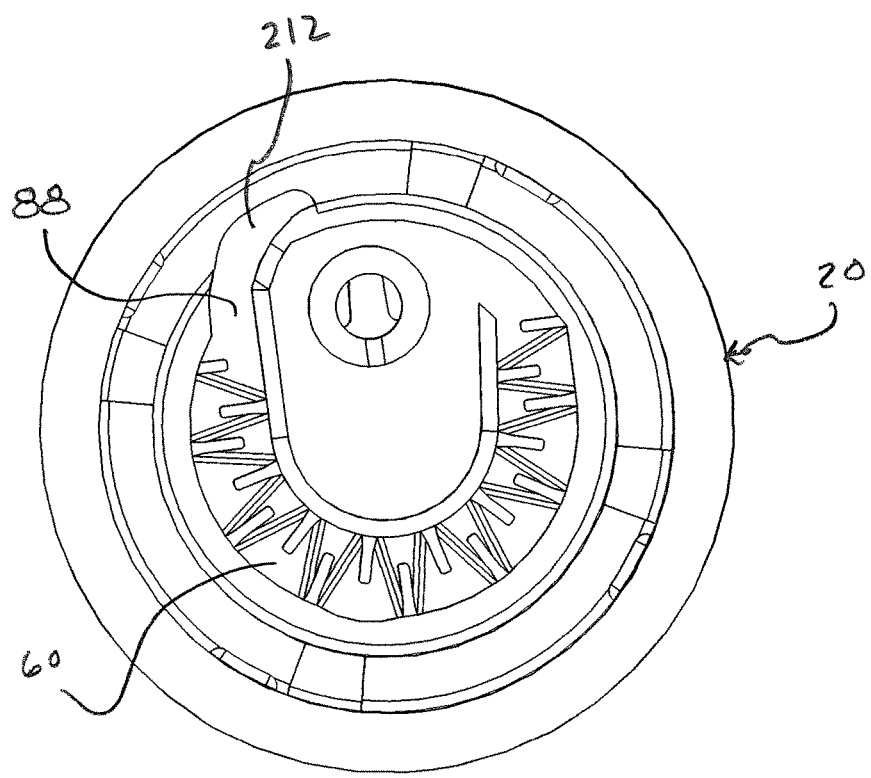
FIG. 8 is a top plan view of the emitter of FIG. 7 with its cover, first and second diaphragms removed.
Figure 9:
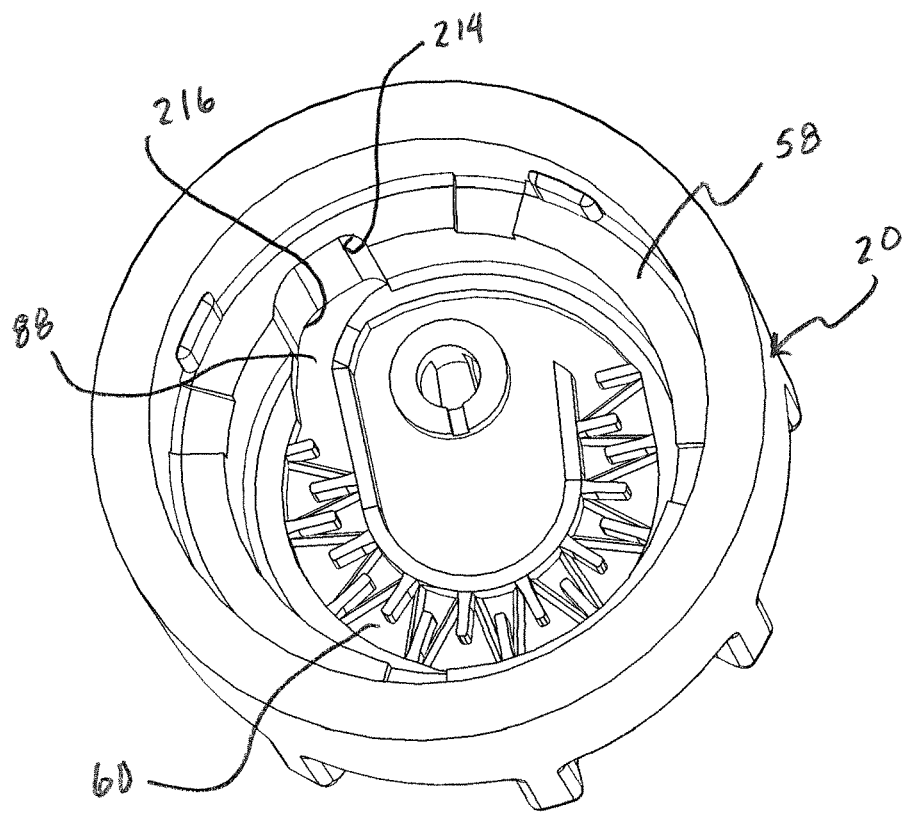
FIG. 9 is a perspective view of the emitter of FIG. 7 with its cover, first and second diaphragms removed.

Referring to FIGS. 7-9, there is illustrated a first alternative drip emitter 210. The drip emitter 210 is similar to the drip emitter 10 of FIGS. 1-6 with one primary exception related to the body 20. Therefore, the reference numbers used above will be used for this embodiment except new reference numbers are used to point out differences.

The primary difference is that the body 20 defines a groove 212 that extends vertically along the interior chamber 52 from the ledge 58 that supports the first diaphragm 44 to below the second diaphragm 46. An upper end of the groove 212 provides a break 214 in the ledge 58 to allow water to flow past the first diaphragm 44 to the interior chamber 52 between the first and second diaphragms 44, 46. A lower end 216 of the groove 212 is positioned at the inlet 88 of the tortuous path 60. Water can enter the groove 212 both from above the first diaphragm 44 and between the first and second diaphragms 44, 46. The groove 212 provides an additional path from above the first diaphragm 44 to the interior chamber 52 between the first and second diaphragms 44, 46. The groove 212 replaces the break 68 of the drip emitter 10 of FIGS. 1-6 that allows water to pass from between the first and second diaphragms 44, 46 to below the second diaphragm 46.

Figure 10:
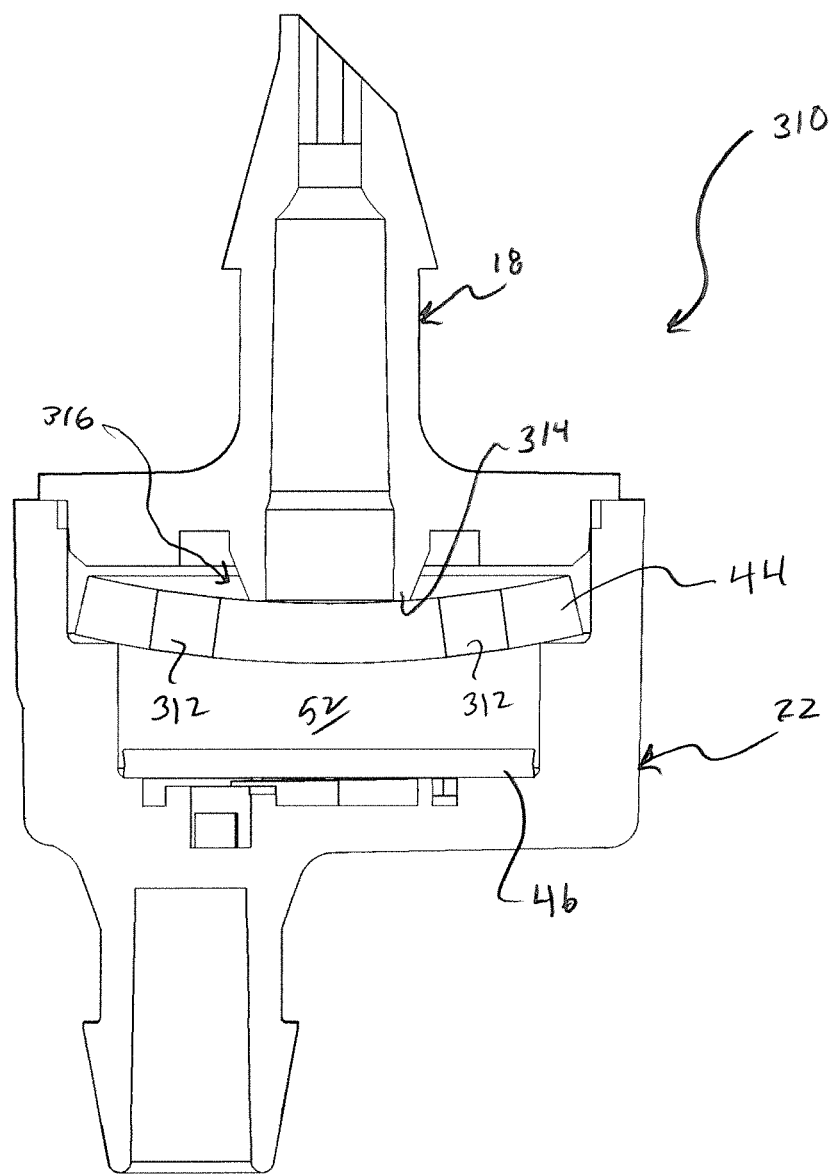
FIG. 10 is a central cross-section of a second alternative drip emitter embodying features of the present invention.
Figure 11:
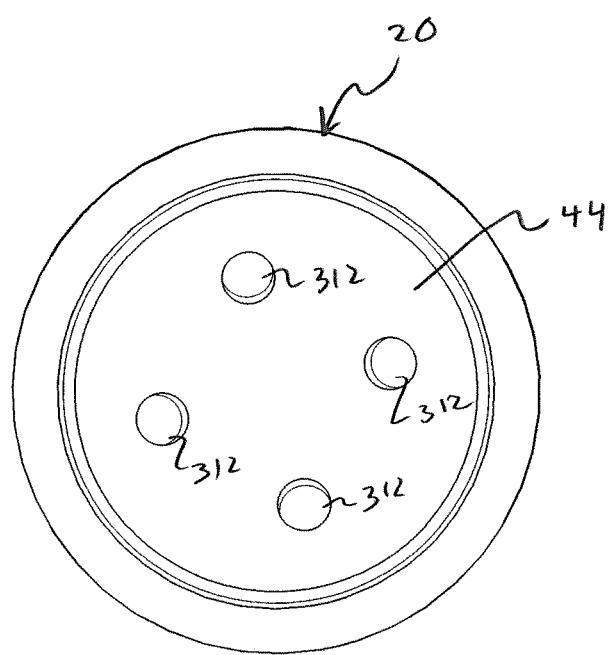
FIG. 11 is a top plan view of the emitter of FIG. 10 with its cover removed.

With reference to FIGS. 10 and 11, there is illustrated a second alternative drip emitter 310. The drip emitter 310 is similar to the drip emitter 10 of FIGS. 1-6 with a few primary exceptions related to the first diaphragm 44 and the inlet tube 18. Therefore, the reference numbers used above will be used again for this embodiment except new reference numbers are used to point out differences.

Instead of using flow passages 62 through the ledge 58 supporting the first diaphragm 44 to allow water to flow past the first diaphragm 44, the first diaphragm 44 itself includes at least one diaphragm passage 312, preferably four diaphragm passages 312, to allow water to pass into the interior chamber 52 between the first and second diaphragms 44, 46. The inlet tube 18 terminates in the interior chamber 52 with a valve seat 314 having a reduced diameter when compared to the valve seat 54 of the emitter 10. The diaphragm passages 312 are disposed outside the surface of the first diaphragm 44 that engages the valve seat 314. For example, there is illustrated in FIG. 11 a square pattern of four diaphragm passages 312 where the size of the square pattern is larger than the diameter of the valve seat 314. The center of the square pattern also can be aligned with the center of the valve seat 314.

The diaphragm 44 and the valve seat 314 form a check valve 316. When there is sufficient supply pressure, such as during a water event, the first diaphragm 44 moves away from the valve seat 314 and water flows through the diaphragm passages 312 into the interior chamber 52 between the first and second diaphragms 44, 46. After the watering event, the first diaphragm 44 closes against the valve seat 314. The check valve 316 can be designed to hold-back a certain amount of water upstream of the check valve 316 between watering events. In this embodiment, for example, the interference of the valve seat 314 and the first diaphragm 44 can be increased or decreased to change the amount of upstream hold-back. For example, if the amount that the inlet 18 extends into the interior chamber 52 is increased, then the amount of upstream hold-back would increase. In contrast, if the inlet 18 extends less into the interior chamber 52, then the amount of upstream hold-back would decrease. Further, if you increase the diameter of the valve seat 314, the response speed of the first diaphragm 44 would increase, while decreasing the diameter of the valve seat would reduce the response speed of the first diaphragm 44. The response speed is the opening and closing speeds. In increasing the diameter of the valve seat 314, the spacing of the diaphragm passages 312 may have to be increased to ensure that they are beyond the perimeter of the valve seat 314 when the first diaphragm 44 is moved away from the valve seat 314. The diaphragm 44 of the emitter 310 can be used with the body 20 of either emitter 10 or emitter 210.

Figure 12:
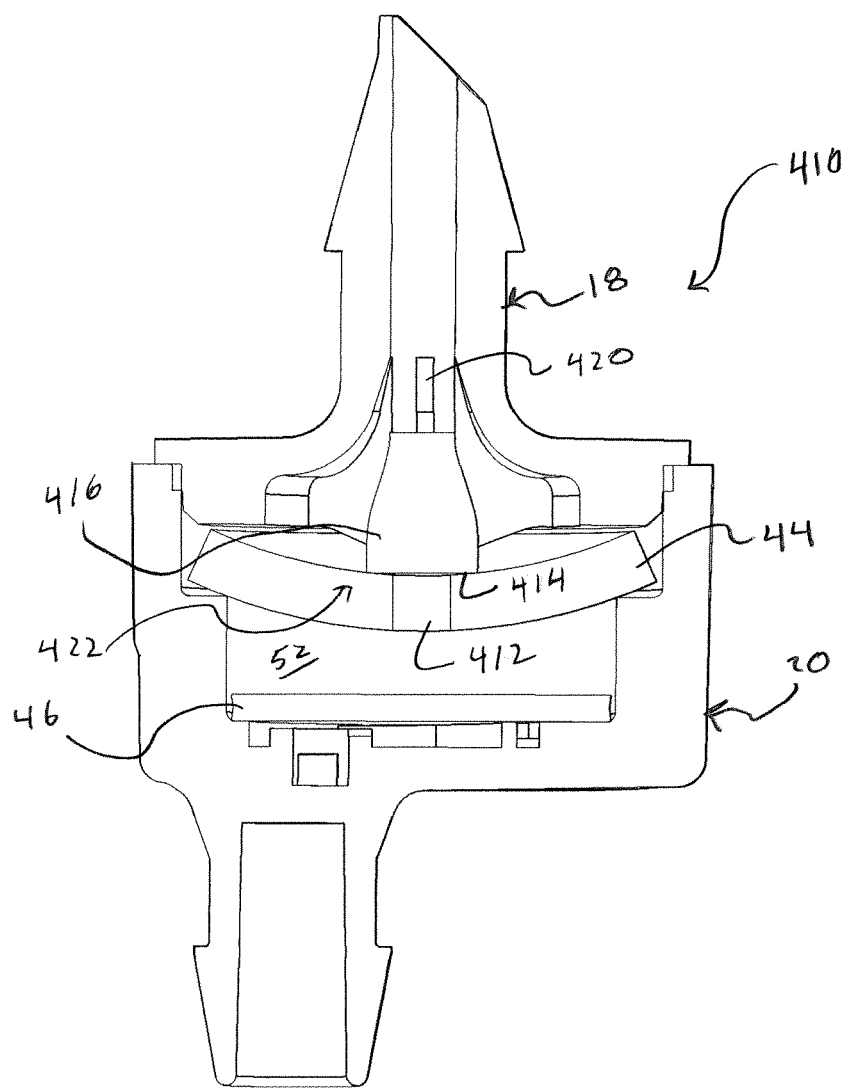
FIG. 12 is a central cross-section of a third alternative drip emitter embodying features of the present invention.
Figure 13:
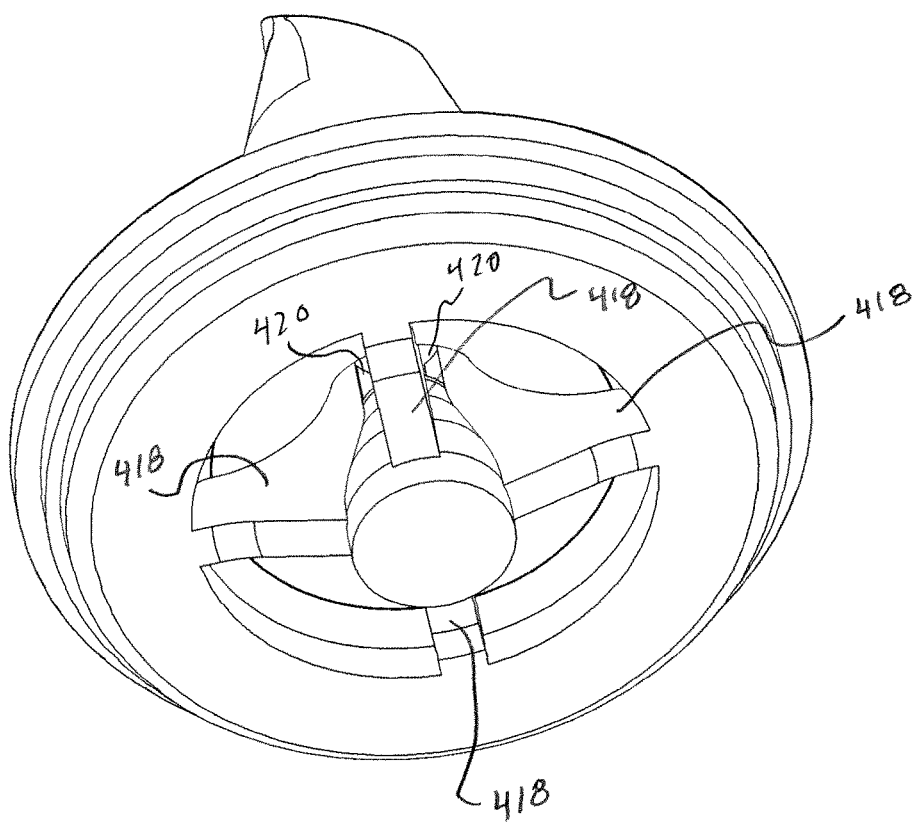
FIG. 13 is bottom perspective of a cover of the emitter of FIG. 12.
Figure 14:
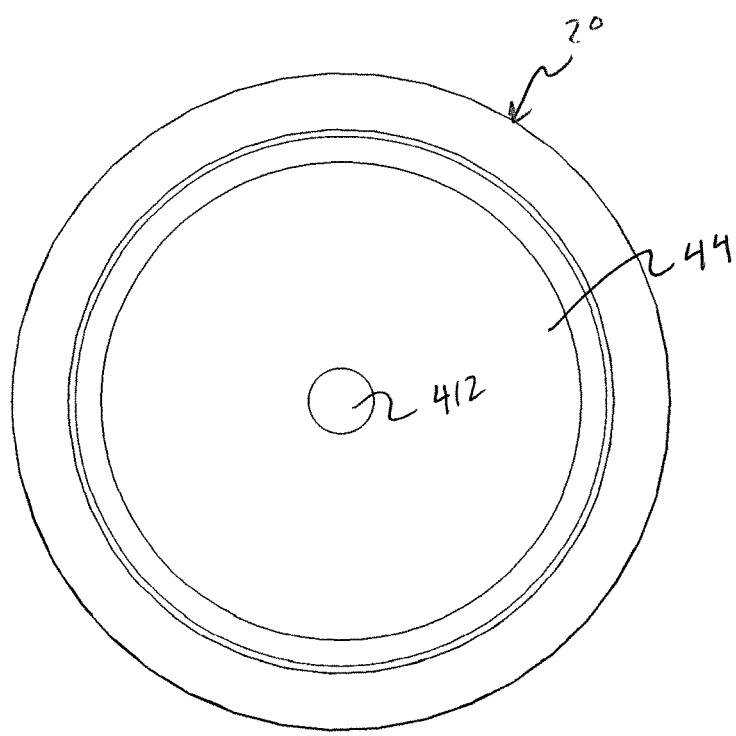
FIG. 14 is a top plan view of the emitter of FIG. 12 with its cover removed.

With reference to FIGS. 12-14, there is illustrated a third alternative drip emitter 410. The drip emitter 410 is similar to the drip emitter 10 of FIGS. 1-6 with a few primary exceptions related to the first diaphragm 44 and the inlet tube 18. Therefore, the reference numbers used above will be used again for this embodiment except new reference numbers are used to point out differences.

Instead of using flow passages 62 through the ledge 58 holding the first diaphragm 44 to allow water to flow past the first diaphragm 44, the first diaphragm 44 itself includes a centrally positioned diaphragm passage 412 to allow water to pass into the portion of the interior chamber 52 between the first and second diaphragms 44, 46. The inlet tube 18 terminates in the portion of the interior chamber 52 above the diaphragm 44 with a sealing surface 414 that covers the diaphragm passage 412 between watering events to prevent water passing through the emitter 410. The sealing surface 414 is on a boss 416 supported by four spokes 418. Upstream of the boss 416, the inlet tube 18 defines four equally spaced radial passages 420 to supply water to the interior chamber 52 above the first diaphragm 44.

The portion of the diaphragm 44 about the passage 412 and sealing surface 414 of the boss 416 form a check valve 422. When there is sufficient supply pressure, such as during a water event, the first diaphragm 44 moves away from the boss 416 and water flows through the diaphragm passage 412 into the portion of the interior chamber 52 between the first and second diaphragms 44, 46. After the watering event, the first diaphragm 44 closes against the sealing surface 414 of the boss 416. The check valve 422 can be designed to hold-back a certain amount of water upstream of the check valve 422 between watering events. In this embodiment, for example, the boss 416 can be lengthened to increase the amount of upstream hold-back and shortened to decrease the amount of upstream hold-back. Further, if you increase the size of the radial passages 420, the check valve 422 would open sooner, thereby reducing the amount of hold-back. The diaphragm 44 of the emitter 410 can be used with the body 20 of either emitter 10 or emitter 210.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution. The actual scope of the protection sought is intended to be defined in the following claims.

What is claimed is:

1. An online drip emitter comprising:
a body defining an inlet, an outlet and an interior chamber;
a valve seat communicating with the inlet and located in the interior chamber upstream of the outlet;
a first diaphragm in the interior chamber and being associated with the valve seat to prevent flow through the on-line drip emitter below a first pressure;
a tortuous path downstream of the first diaphragm and valve seat;
a second diaphragm spaced from the first diaphragm in the interior chamber and being capable of sealing the tortuous path upon being subject to a second pressure, and the entire second diaphragm being free to move in the interior chamber;
wherein the second pressure is greater than the first pressure; and
wherein the first and second diaphragms do not contact each other during operation and operate in different planes.

2. The online drip emitter of claim 1 wherein the body defines at least one passage extending past the first diaphragm to allow fluid to flow downstream from the inlet past the first diaphragm.

3. The online drip emitter of claim 2 wherein the at least one passage includes a plurality of passages extending past the first diaphragm to allow fluid to flow downstream from the inlet past the first diaphragm.

4. The online drip emitter of claim 2 wherein the at least one passage extending past the first diaphragm and the second diaphragm to allow fluid to flow downstream from the inlet past the first diaphragm and second diaphragm.

5. The online drip emitter of claim 1 wherein the first diaphragm defines at least one passage therethrough to allow fluid to flow downstream from the inlet past the first diaphragm.

6. The online drip emitter of claim 5 wherein the at least one passage includes a plurality of passages extending through the first diaphragm to allow fluid to flow downstream from the inlet past the first diaphragm.

7. The online drip emitter of claim 6 wherein the plurality of passages are disposed outside of the valve seat.

8. The online drip emitter of claim 5 wherein the valve seat includes a sealing surface that blocks the at least one passage to prevent flow through the at least one passage.

9. The online drip emitter of claim 8 wherein inlet includes passages to the interior chamber upstream of the valve seat.

10. The online drip emitter of claim 1 wherein the first diaphragm operates in a first plane and the second diaphragm operates in a second plane, and the second plane being downstream of the first plane.

11. An online drip emitter comprising:
a body defining an inlet, an outlet and an interior chamber;
a valve seat communicating with the inlet and located in the interior chamber upstream of the outlet;
a first diaphragm in the interior chamber and forming a convex surface being associated with the valve seat to prevent flow through the on-line drip emitter below a first pressure;
a tortuous path downstream of the first diaphragm and valve seat;
a second diaphragm spaced from the first diaphragm in the interior chamber and being capable of sealing the tortuous path upon being subject to a second pressure; and
wherein the second pressure is greater than the first pressure; and
wherein the first and second diaphragms do not contact each other and are oriented to operate in different planes.

12. The online drip emitter of claim 11 further comprising an inlet tube defining the valve seat in the interior chamber, the inlet and the first diaphragm forming a check valve with a desired hold-back pressure, and the inlet tube having a length into the interior chamber selected to provide the desired hold-back pressure.

* * * * *